(12) United States Patent
Lozhkin

(10) Patent No.: US 7,317,761 B2
(45) Date of Patent: Jan. 8, 2008

(54) MULTI-CARRIER COMMUNICATION SYSTEM AND RECEIVER THEREOF

(75) Inventor: Alexander N. Lozhkin, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 456 days.

(21) Appl. No.: 11/086,416

(22) Filed: Mar. 23, 2005

(65) Prior Publication Data

US 2005/0163241 A1    Jul. 28, 2005

Related U.S. Application Data

(63) Continuation of application No. PCT/JP03/00950, filed on Jan. 31, 2003.

(51) Int. Cl.
*H04L 27/28* (2006.01)

(52) U.S. Cl. ............... 375/260; 375/262; 375/265; 375/316; 375/147; 375/346; 370/203; 370/281; 370/344; 370/464; 370/478; 714/792; 714/794; 714/795; 714/786

(58) Field of Classification Search ............. 375/141, 375/147, 260, 262, 265, 285, 316, 324, 340, 375/341, 346; 370/203, 281, 321, 344, 436, 370/442, 464, 465, 478; 714/792, 794, 795, 714/786
See application file for complete search history.

(56) References Cited

U.S. PATENT DOCUMENTS 6,879,640 B1 * 4/2005 Agazzi ................. 375/295

| 6,895,060 B2 * | 5/2005 | Kroeger et al. ............. 375/340 |
| 7,006,429 B2 * | 2/2006 | Yoshida et al. ............. 370/208 |
| 7,095,791 B2 * | 8/2006 | Jones et al. ................. 375/260 |

FOREIGN PATENT DOCUMENTS

| JP | 10-178458 | 6/1998 |
| JP | 2001-211088 | 8/2001 |
| JP | 2001-217724 | 8/2001 |

* cited by examiner

*Primary Examiner*—Chieh M. Fan
*Assistant Examiner*—Siu M Lee
(74) *Attorney, Agent, or Firm*—Staas & Halsey LLP

(57) ABSTRACT

The present invention is a multi-carrier communication system for transmitting/receiving signals via at least four sub-channels, comprising: a transmitter for transmitting data independently via the four sub-channels; a receiver comprising a receive unit disposed for each sub-channel for receiving data from a corresponding sub-channel and performing soft decision of the receive data; and means for inputting soft decision target values in receive units corresponding to three sub-channels other than a target sub-channel to a receive unit of the target sub-channel, wherein the receive unit of the target sub-channel adjusts its own soft decision target value using the soft decision target values that are input from the receive units of the other sub-channels, and decides the receive data based on this adjusted soft decision target value.

6 Claims, 11 Drawing Sheets

# MULTI-CARRIER COMMUNICATION SYSTEM AND RECEIVER THEREOF

This application is a continuing application, filed under 35 U.S.C. §111(a), of International Application PCT/JP03/00950, filed Jan. 31, 2003.

BACKGROUND OF THE INVENTION

The present invention relates to a multi-carrier communication system and a receiver thereof, and more particularly to a multi-carrier communication system using the interference between a target sub-channel and two or more upper and lower sub-channels (ICI) and a receiver thereof.

The bit error rate (BER) of the multi-carrier communication system in filter bank modulation, DMT modulation and FMT modulation can be improved by using receive signals that include distortion by inter-channel interference (ICI). Inter-channel interference occurs by the malfunction of a system in communication systems, such as OFDM-CDMA, or due to an unavoidable environment such as the loss of orthogonality between sub-channels. Inter-channel interference, which is called the "leak of spectrum energy", at times the cross-talk between sub-channels, is caused by a leak.

A major advantage of the turbo receiver of the present invention is that the phenomenon of ICI is handled as a zero mean Gaussian distribution random variable (e.g. Gaussian approximation used in the following document 1 below), for which a finite state discrete Markov process model is used. For such an ICI model, simple Gaussian approximation seems to be more practical because of the nature of ICI. The turbo receiver of the present invention is based on a maximum posterior probability estimation algorithm. In this turbo receiver, information derived from one sub-channel after non-linear processing refines the estimated maximum posterior probability of the latter channel, and in the same way, the information derived from the other sub-channel refines the estimated maximum probability of the former sub-channel.

Document 1: K. Sathanathan and C. Tellambura: "Probability of error calculation of OFDM system with frequency offset", IEEE Trans. Commun., Vol. 49, NO. 11, November 2001, pp. 1884-1888.

(a) Relationship Between Frequency Offset and ICI

In the case of a multi-carrier communication system where a band is divided into a plurality of sub-bands, which are independent narrow bands, and the transmission data of each sub-band is frequency-multiplexed and transmitted and received, the selection of a filter set in a multi-carrier communication system for filter bank modulation, DMT (Discrete Multi-tone) modulation and FMT (Filtered Multi-tone) modulation, has been executed under the constraint that inter-symbol interference (ISI) and inter-channel interference (ICI) are completely removed.

In an ideal transmission channel where there is no Doppler shift and where there is no offset frequency between transmitter/receiver and signal distortion does not occur, this constraint guarantees the receiver that the recovery of transmission symbols to be error free. However the frequency offset which is generated in each channel, due to inaccurate tuning of the oscillator and the Doppler shift, causes BER deterioration due to a spectrum leak or ICI.

The only method to relax such deterioration of BER is to minimize the frequency offset, and more particularly, to maintain it to be within 1% of the sub-carrier frequency interval. This method, however, requires accurate frequency offset estimation, and also if the noise level is high when multi-carrier signals mixed with noise are received, the accuracy of frequency offset estimation is affected. Also according to this method, the Doppler shift is not consistent with respect to the transmission symbols in a high-speed fading channel, and operation becomes inaccurate in a high-speed fading channel which changes depending on the time.

Here the case of a DMT base system and an ideal white Gaussian noise (AWGN) channel is assumed. It is also assumed that the level of inter-symbol interference ISI can be ignored compared with the inter-channel interference ICI and other noise signals. To simplify description, only a target channel, the first adjacent sub-channel located below the target sub-channel and the second adjacent sub-channel located above the target sub-channel, are considered. FIG. 1 and FIG. 2 show the frequency response of the three channels in the case when the frequency offset is zero (FIG. 1), and in the case when the frequency offset is not zero (FIG. 2). The signals of the central frequencies $f_1$, $f_2$ and $f_3$ corresponding to the first, second and third sub-channels are indicated by the vertical arrows in FIG. 1 and FIG. 2. In FIG. 1 and FIG. 2, the sub-channel number 0 (ch0) indicates the target sub-channel, the sub-channel number −1 (ch−1) is a sub-channel located below the target sub-channel in the frequency scale, and the sub-channel number +1 (ch+1) indicates the sub-channel located above the target sub-channel in the frequency scale. If the cycle of the DMT symbol is T, then the frequency scale is normalized with a channel interval equal to 1/T. In other words, one unit of the frequency scale is the channel interval. As FIG. 1 shows, when the frequency offset (normalized by the channel interval) $\alpha$ is 0, the transfer function of the lower sub-channel and the upper sub-channel, indicated by the solid line A and the dotted line B in FIG. 1, gives infinite attenuation in the central frequency $f_2$ of the target sub-channel (dotted line C). In the same way, the transfer function of the target sub-channel gives infinite attenuation in the central frequencies $f_1$ and $f_3$ of the lower and the upper sub-channels. In other words, if the frequency offset $\alpha$ is zero, ICI is not generated between adjacent sub-channels. This means that if the frequency offset is zero, the respective sub-channels intersect orthogonally, and ICI does not exist at all.

If the frequency offset $\alpha$ is not zero, however, the orthogonality of the sub-channels is affected, and ICI is generated. FIG. 2 shows the spectrum characteristics of each sub-channel of the DMT system when the frequency offset $\alpha$ is not zero. The spectrum of adjacent channels cross at −3 dB, and the first side-lobe is −13 dB, which is high. In order to avoid a complex system model, the case when the sub-channels which are distant for a 1 or 2 channel interval interfere with each other will be considered below. It is clear that the spectrum of an adjacent sub-channel has a mutual gain which is not zero, which is indicated as $\alpha_{0-1}$, $\alpha_{1-1}$, $\alpha_{10}$, $\alpha_{-10}$, $\alpha_{01}$ and $\alpha_{-11}$. In these notations the first index of $\alpha$ indicates the interference source sub-channel, and the second index indicates the interference target sub-channel. In other words, $\alpha_{-10}$ indicates the leak transfer coefficient (amplitude) from the lower sub-channel with the sub-channel number −1 to the target channel with the sub-channel number 0. $\alpha_{-11}$ indicates the leak transfer coefficient (amplitude) from the lower sub-channel with the sub-channel number −1 to the upper sub-channel with the sub-channel number 1, $\alpha_{01}$ indicates the leak transfer coefficient from the target sub-channel with the sub-channel number 0 to the higher sub-channel with the sub-channel number 1, $\alpha_{0-1}$ indicates the leak transfer coefficient from the target sub-channel with the sub-channel number 0 to the lower sub-channel with the sub-channel number −1, and $\alpha_{10}$ indicates the leak transfer coefficient from the higher sub-channel with the sub-channel number +1 to the target sub-channel with the sub-channel number 0. As described above, if the frequency offset $\alpha$ is not zero, the mutual gain which is not zero, that is ICI (cross-talk), is generated between sub-channels.

(b) General Model of Communication System

FIG. 3 is a general model (four sub-channel model) depicting the mutual ICI of four sub-channels in a DMT system having frequency offset. Compared with the three sub-channel model (see FIG. 4), according to the turbo receiver of the present invention, the four sub-channel model can improve the total system BER in more cases because of the low roll off spectrum characteristics of DMT. $1_1$, $1_2$, $1_3$ and $1_4$ are the transmitters of the sub-channels ch−1, ch0, ch+1 and ch+2, $2_1$, $2_2$, $2_3$ and $2_4$ are the receivers of each sub-channel, $3_1$, $3_2$, $3_3$ and $3_4$ are the transmission lines of each sub-channel. $4_{ij}$ is a multiplier to multiply the sub-channel signal $D_i$ by the leak transfer coefficient (interference coefficient) $\alpha_{ij}$ of the sub-channel with the number i to the sub-channel with the number j respectively, $5_1$, $5_2$, $5_3$ and $5_4$ are the first synthesizing units for synthesizing the cross-talk (ICI) from the adjacent sub-channel to its own sub-channel signal, $6_1$, $6_2$, $6_3$ and $6_4$ are the second synthesizing units for synthesizing the cross-talk (ICI) from the sub-channel which is distant from two channel intervals to its own sub-channel signal, and $7_1$, $7_2$, $7_3$ and $7_4$ are the noise synthesizing units.

As FIG. 3 shows, the signals from the lower sub-channel ch−1 leak into the target sub-channel ch0 via the cross-talk coefficient $\alpha_{-10}$, the signals from the upper sub-channel ch+1 leak into the target sub-channel via the cross-talk coefficient $\alpha_{10}$, and the signals from the upper sub-channel ch+2 leak into the target sub-channel ch0 via the cross-talk coefficient $\alpha_{20}$. Also the signals from the lower sub-channel ch−2 leak into the target sub-channel via the cross-talk coefficient $\alpha_{-20}$, but description thereof will be omitted since this can be regarded as the same as the leak from the ch+2. In the model in FIG. 3, the sub-channels that cause mutual interference are limited to the upper and lower sub-channels, but the number of sub-channels in the entire communication system is not limited, so the model in FIG. 3 can also be applied to a multi-carrier communication system that has N number of sub-channels, where N is 4 or a greater number. In such a case as well, interference to each sub-channel is only from the lower two sub-channels and the upper two sub-channels. In this case, the interference coefficient indicates a chain of coefficients. The noise components denoted as $n_1(t)$, $n_2(t)$, $n_3(t)$ and $n_4(t)$ in FIG. 3 are statistically independent (no correlation) because of the frequency orthogonality between the sub-channels.

The sub-channels are located in the frequency domain, but this model can be applied not only to a DMT modulation type or a filter bank modulation type system, but also to other systems. The dimensions can be expanded to other domains, such as space (space division multiplex axis) and polarity.

(c) Technical Problem

The model in FIG. 3 is beneficial in terms of understanding the physical process which causes ICI. The problem of this model lies in accurately deciding the receive signals of each sub-channel and the value of the transmission information symbols (a sign if a binary number).

One possible method to reduce ICI in a receiver is applying the decision feedback equalizer (DFE) to cancel ICI, which is proposed in the following document 2.

Document 2: Viterbo and K. Fazel, "How to combat long echoes in QFDM transmission schemes: Sub-channel equalization or more powerful channel coding," Proc. IEEE Globecom '95, Singapore, November 1995, pp. 2069-2074.

If the output of an individual receiver is in hard bit decision (hard decision) format, then sharing information among sub-channels has only a few benefits. This restricts the operation range of DFE which uses a hard decision.

The above mentioned approach is effective in many practical cases, but is for minimizing the effect of ICI, and is the second best approach. Since ICI includes information on transmission symbols, it is possible to remodulate the receive signals quite well by using this transmission symbol information included in ICI.

SUMMARY OF THE INVENTION

With the foregoing in view, it is an object of the present invention to improve BER performance using the ICI in a communication system where ICI exists.

It is another object of the present invention to decrease BER based on the posterior probability using ICI.

The present invention is a multi-carrier communication system for transmitting/receiving signals via at least four sub-channels, comprising a transmitter for transmitting data independently via four channels, a receiver comprising a receive unit disposed for each sub-channel for receiving data from a corresponding sub-channel and performing soft decision of the receive data, and means for inputting soft decision target values in the receive units corresponding to sub-channels other than a target sub-channel to a receive unit of the target sub-channel, wherein the receive unit of the target sub-channel adjusts its own soft decision target value using the soft decision target values that are input from the receive units of the other sub-channels, and decides the receive data based on the adjusted soft decision target value.

The receive unit of the target sub-channel further comprises means for computing a difference between a probability that the data received from the target sub-channel is one value of a binary and a probability that the data is the other value of a binary as the soft decision target value, considering degree of coupling of cross-talk paths, means for adjusting the soft decision target value of the target sub-channel using the soft decision target values that are input from the receive units of the other sub-channels, and a decision unit for deciding the receive data based on adjusted the soft decision target value.

BRIEF DESCRIPTION OF THE DRAWINGS

DESCRIPTION OF THE PREFERRED EMBODIMENTS (A) General Configuration of Communication System in the Case of Three Sub-Channels FIG. 4 is a general block diagram depicting a communication system that demodulates receive data using the interference between a total of two sub-channels, lower and upper, and is a case when the number of sub-channels is three. The intent of the present invention is to provide a communication system having at least four sub-channels (four sub-channel model), but a communication system having three sub-channels (three sub-channel model) will be described first to assist in understanding the present invention.

Figure 1:
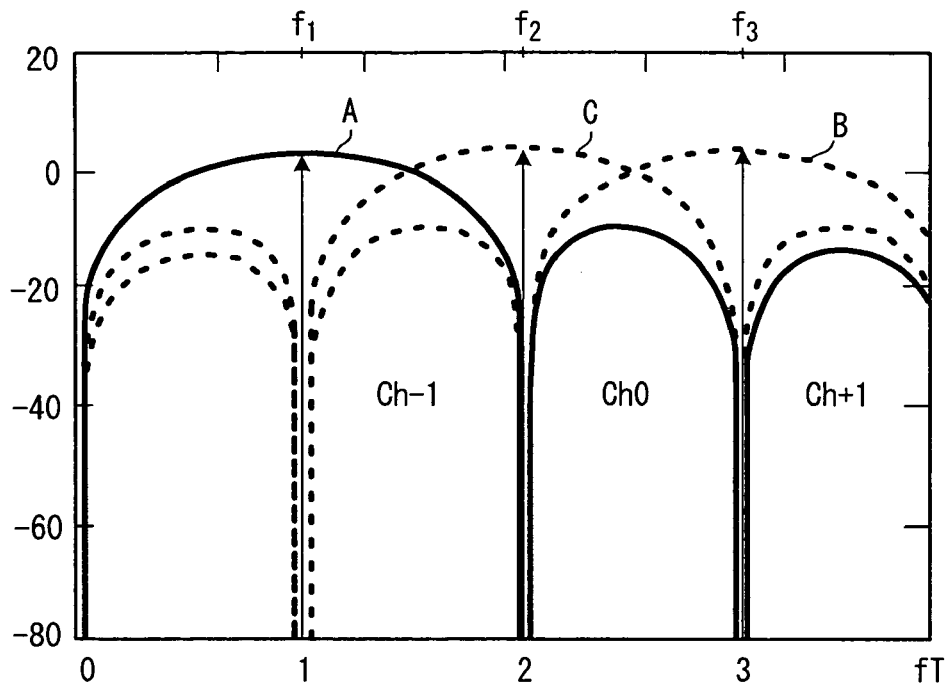
FIG. 1 shows the frequency characteristics when the frequency offset is zero.
Figure 2:
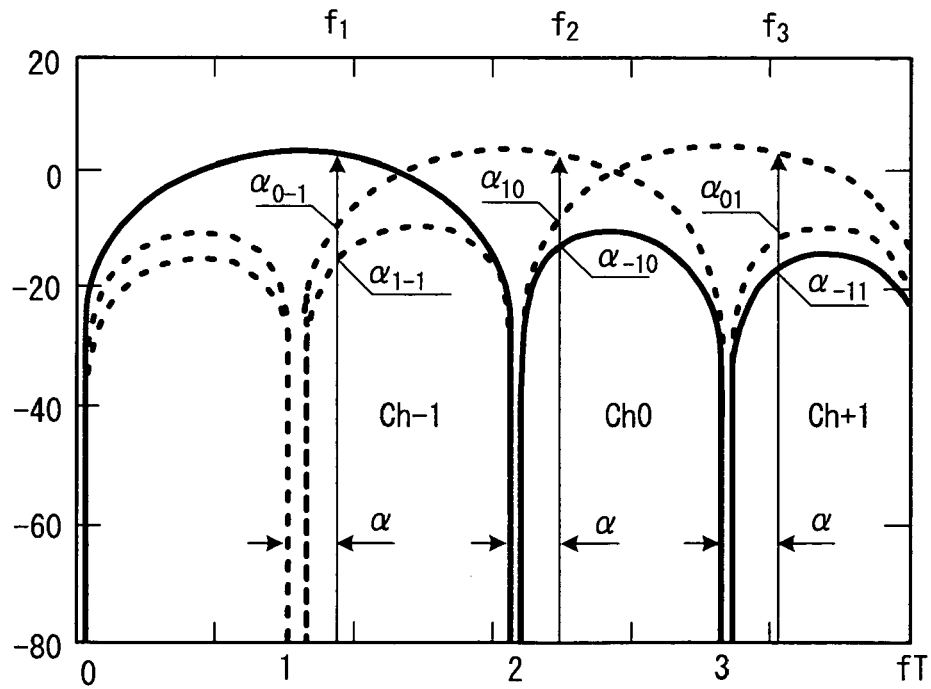
FIG. 2 shows the frequency characteristics when the frequency offset is not zero.
Figure 3:
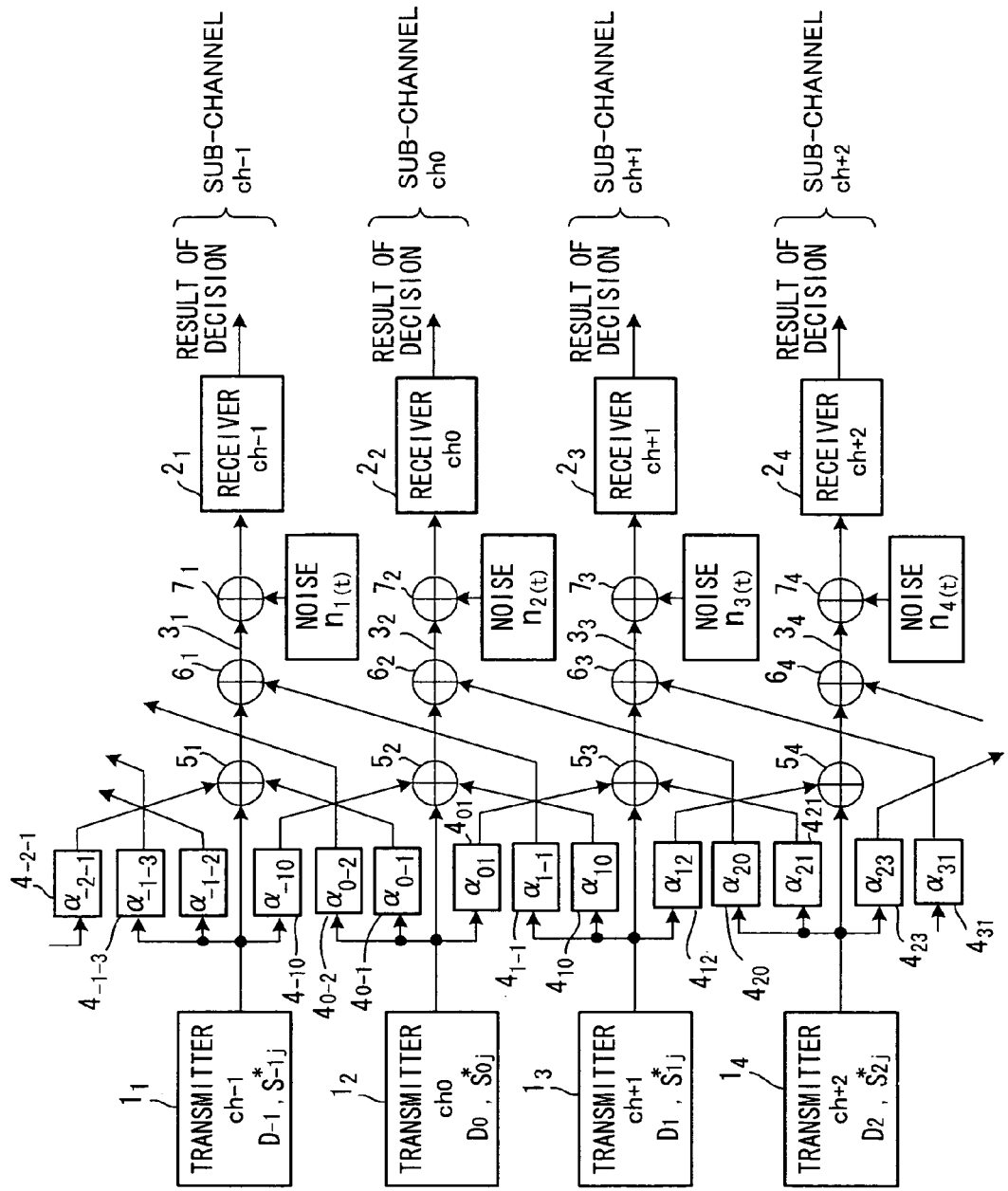
FIG. 3 shows a general model for depicting the mutual ICI of four channels in a DMT system having frequency offset.
Figure 4:
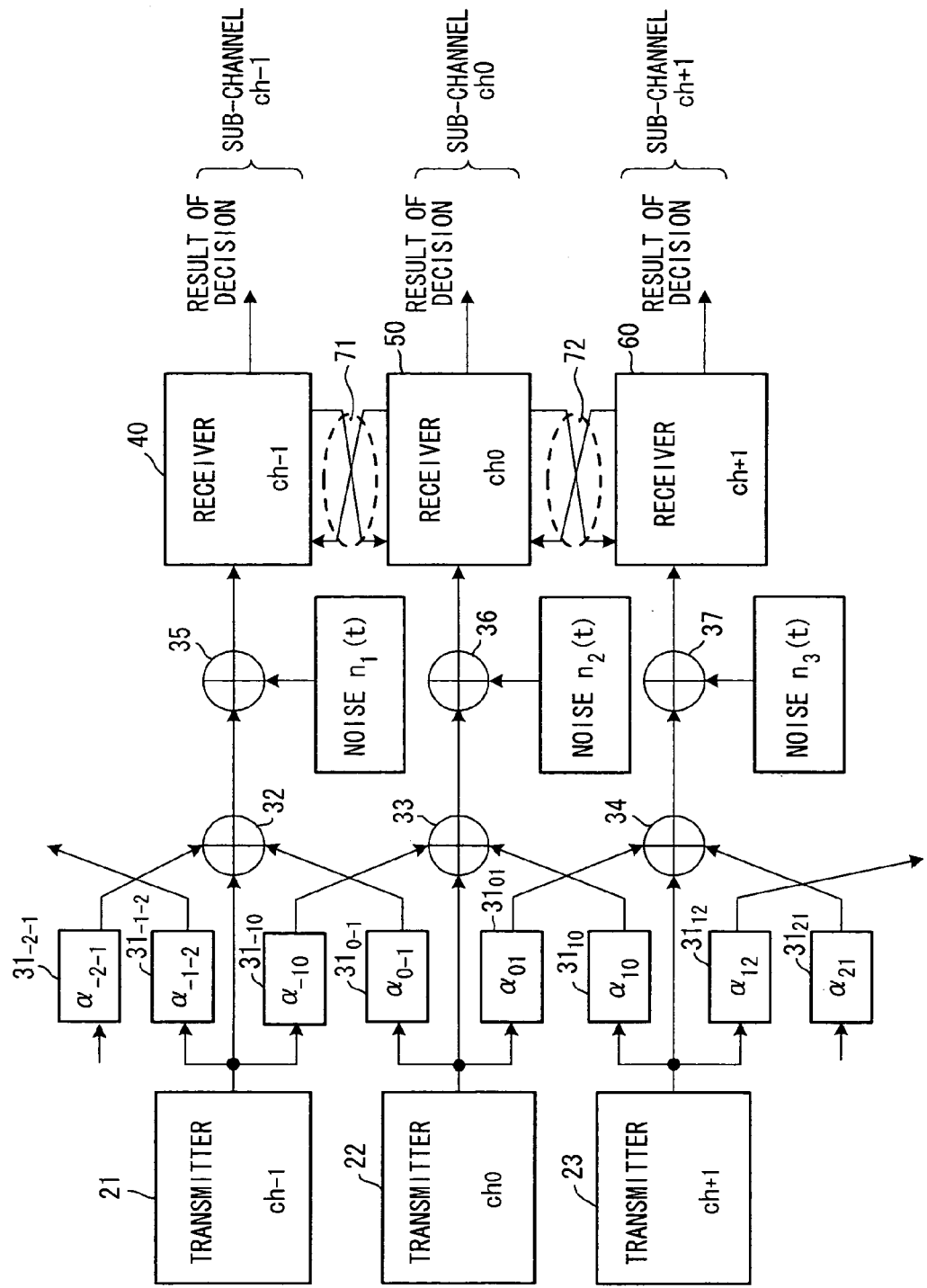
FIG. 4 is a general block diagram depicting a communication system that demodulates receive data using the interference between lower one sub-channel and upper one sub-channel.

The communication system in FIG. 4 comprises three transmitters, 21, 22 and 23, for transmitting data independently via the three sub-channels, ch−1, ch0 and ch+1 respectively, many cross-talk paths $31_{ij}$ having a coupling coefficient $\alpha_{ij}$ to the i-th to the j-th sub-channel, three receivers, 40, 50 and 60, which are installed for each sub-channel for receiving data from the corresponding sub-channel and performing the soft decision of the receive data, and means 71 and 72 for inputting the soft decision target value of each receiver to another receiver. 32-34 and 35-37 are synthesizing units for synthesizing ICI signals and noise.

The receiver 50 of the sub-channel ch0 adjusts its own soft decision target value using the soft decision target values which were input from the receivers 40 and 60 of the lower and upper sub-channels ch−1 and ch+1, and decides "0" or "1" of the receive data based on the soft decision target value. In the same way, the other respective receivers adjust its own soft decision target value using the soft decision target values which were input from the receivers of the lower and upper sub-channels, and decides "0" or "1" of the receiver data based on the soft bit decision target value.

(B) Algorithm of Receive Symbol Demodulation in Three Sub-Channels

An algorithm for the receiver of the target sub-channel ch0 to demodulate the receive signals in the communication system shown in FIG. 4, will be described.

The principle of the demodulation algorithm is to derive the value $InD_0$ which indicates the difference of the posterior probability $P(D_0=+1/y(t))$ of the information symbol received by the target sub-channel ch0 becoming "0" (=+1) and the posterior probability $P(D_0=-1/y(t))$ of this becoming "1" (=−1). This is because if the difference $InD_0$ of the posterior probability can be derived, it can be decided whether the receive information symbol is "0" or "1". In other words, the probability difference $InD_0$ of the target sub-channel is the difference between the posterior probability $P(D_0=+1/y(t))$ of the receive information symbol becoming "0" (=+1), and the posterior probability $P(D_0=-1/y(t))$ of this becoming "1" (=−1), so if $InD_0>0$, then the receive information of the target sub-channel is "0", and if $InD_0<0$, then the receive information of the target sub-channel is decided as "1". According to the above, the value $InD_0$ to indicate the difference of the posterior possibility, is derived.

It is assumed that the binary information is transmitted as the signal $S^*_{ij}(t)$ via the two adjacent sub-channels. The index i of $S^*_{ij}(t)$ is determined by the sign of the information symbol $D_i(i=-1, 0$ or $1)$ in sub-channel i. In other words, if $D_i=+1$, then j=0 if $D_i=-1$, then j=1 (1)

Hereafter to simplify notation, the time dependency of $S^*_{ij}(t)$ in expressions is omitted. In other words, $S^*_{ij}(t)$ is denoted as $S^*_{ij}$.

It is assumed that the transmission information symbol $D_i$ is statistically independent (no correlation) and is an equally distributed probability variable. As FIG. 4 shows, the signal of the target sub-channel affected by ICI from the lower and upper sub-channels is expressed as the linear coupling of the signals $S^*_{-1j}$ and $S^*_{1j}$ transmitted by the upper and lower sub-channels and the target channel signal $S^*_{0j}$ by the cross-talk coefficient $\alpha$. The cross-talk coefficient $\alpha$ is a value according to the leak of cross-talk. If the information symbol $D_0$ of the target channel is +1, then the receive signal $S_j$ (j=0-3) of the target channel becomes $$\begin{cases} S_0 = S^*_{00} + \alpha_{-10} \cdot S^*_{-10} + \alpha_{10} \cdot S^*_{10}, & D_0 = +1, D_{-1} = +1, D_1 = +1 \\ S_1 = S^*_{00} + \alpha_{-10} \cdot S^*_{-10} - \alpha_{10} \cdot S^*_{10}, & D_0 = +1, D_{-1} = +1, D_1 = -1 \\ S_2 = S^*_{00} - \alpha_{-10} \cdot S^*_{-10} + \alpha_{10} \cdot S^*_{10}, & D_0 = +1, D_{-1} = -1, D_1 = +1 \\ S_3 = S^*_{00} - \alpha_{-10} \cdot S^*_{-10} - \alpha_{10} \cdot S^*_{10}, & D_0 = +1, D_{-1} = -1, D_1 = -1 \end{cases} \quad (2)$$

depending on whether the signals $D_{-1}$ and $D_1$ of the lower and upper sub-channels are +1 or −1. j of the signal $S_j$ indicates the signal number. In the same way, if the information symbol $D_0$ of the target channel is −1, then the receive signal $S_j$ (j=4-7) of the target channel becomes $$\begin{cases} S_4 = -S_{00}^* + \alpha_{-10} \cdot S_{-10}^* + \alpha_{10} \cdot S_{10}^* = -S_3, D_0 = +1, D_{-1} = +1, D_1 = +1 \\ S_5 = -S_{00}^* + \alpha_{-10} \cdot S_{-10}^* - \alpha_{10} \cdot S_{10}^* = -S_2, D_0 = +1, D_{-1} = +1, D_1 = -1 \\ S_6 = -S_{00}^* - \alpha_{-10} \cdot S_{-10}^* + \alpha_{10} \cdot S_{10}^* = -S_1, D_0 = +1, D_{-1} = -1, D_1 = +1 \\ S_7 = -S_{00}^* - \alpha_{-10} \cdot S_{-10}^* - \alpha_{10} \cdot S_{10}^* = -S_0, D_0 = +1, D_{-1} = -1, D_1 = -1 \end{cases} \quad (3)$$

depending on whether the signals $D_{-1}$, and $D_1$ of the lower and upper sub-channels are +1 or −1.

After introducing ICI, $S_j$ (j=0, 1, 2, ... 7) is used as eight signals in the input of the receiver of each sub-channel. The index j of $S_j$ in the expressions (2) and (3) indicates the signal number, and is determined by airing the symbols $D_{-1}$, $D_1$ and $D_0$ in the lower sub-channel, upper sub-channel and target sub-channel.

By considering the following [1] and [2], an algorithm for optimum reception can be further developed. In other words, by considering [1] that the signs of some information signals are the opposite, that is $-S^*_{-10}=-S^*_{-11}$, $S^*_{00}=-S^*_{01}$, and $S^*_{10}=-S^*_{11}$, and [2] to transmit information symbols a same signal is used for the lower and upper sub-channels and target sub-channel, that is $S^*_{-10}=S^*_{00}=S^*_{10}$, and $S^*_{-11}=S^*_{01}=S^*_{11}$, the algorithm for optimum reception can be further developed. The latter [2] indicates that all the sub-channels have the same value and the information signals of all the sub-channels have no difference in amplitude, waveform and energy. In this case the signals of the expressions (2) and (3) in each sub-channel become a pair, having opposite signs, as shown in the following expressions.

$$\begin{cases} S_0 = S_{00}^* + \alpha_{-10} \cdot S_{-10}^* + \alpha_{10} \cdot S_{10}^* = -S_7 \\ S_1 = S_{00}^* + \alpha_{-10} \cdot S_{-10}^* - \alpha_{10} \cdot S_{10}^* = -S_6 \\ S_2 = S_{00}^* - \alpha_{-10} \cdot S_{-10}^* + \alpha_{10} \cdot S_{10}^* = -S_5 \\ S_3 = S_{00}^* - \alpha_{-10} \cdot S_{-10}^* - \alpha_{10} \cdot S_{10}^* = -S_4 \end{cases} \quad (4)$$

From the expression (2), (3) and (4), the posterior probability to receive the signal $S_j$, that is the posterior probability $P(S_j/y(t))$ of the receive signal becoming $S_j$, is given by the following expression.

$$P[S_j/y(t)] = \\ k_0 \cdot P_{apr}(S_j) \cdot P(y(t)/S_j) = k_0 \cdot P_{apr}(S_j) \cdot \exp\left\{-\frac{1}{N_0} \int_0^T [y(t) - S_j]^2 dt\right\} \quad (5)$$

where $k_0$ is a normalized factor j is a signal number (j=0, 1, ... 7), y(t) is a synthesized signal (y(t)=$S_j$+n(t)) of the signal series $S_j$ involving ICI and the white Gaussian noise n(t) having the spectrum power intensity $N_0$, $P_{apr}(S_j)$ is a prior probability of the receive signal $S_j$, and P (y(t)/$S_j$) is a conditional probability, and is a probability where the transmitted sign signal is $S_j$ when the receive signal is y(t).

In the prior probability $P_{apr}(S_j)$ (j=0, 1, ... 7) is expressed as a cross-product of the prior probability of the signal of the target sub-channel becoming $S^*_{00}$ or $S^*_{01}$ and the posterior probability of the information signal $S^*_{ij}$ in the two adjacent sub-channels. In other words, if $D_0$=+1, the prior probability $P_{apr}(S_j)$ becomes $$\begin{cases} P_{apr}(S_0) = P(S^*_{-10}) \cdot P_{apr}(S^*_{00}) \cdot P(S^*_{10}) \\ P_{apr}(S_1) = P(S^*_{-10}) \cdot P_{apr}(S^*_{00}) \cdot P(S^*_{11}) \\ P_{apr}(S_2) = P(S^*_{-11}) \cdot P_{apr}(S^*_{00}) \cdot P(S^*_{10}) \\ P_{apr}(S_3) = P(S^*_{-11}) \cdot P_{apr}(S^*_{00}) \cdot P(S^*_{11}) \end{cases} \quad (6)$$

and if $D_0$=−1, the prior probability $P_{apr}(S_j)$ becomes $$\begin{cases} P_{apr}(S_4) = P(S^*_{-10}) \cdot P_{apr}(S^*_{01}) \cdot P(S^*_{10}) \\ P_{apr}(S_5) = P(S^*_{-10}) \cdot P_{apr}(S^*_{01}) \cdot P(S^*_{11}) \\ P_{apr}(S_6) = P(S^*_{-11}) \cdot P_{apr}(S^*_{01}) \cdot P(S^*_{10}) \\ P_{apr}(S_7) = P(S^*_{-11}) \cdot P_{apr}(S^*_{01}) \cdot P(S^*_{11}) \end{cases} \quad (7)$$

In expressions (6)-(7), $P_{apr}(S_j)$ is a prior probability (transmission probability) of the information signal $S_j$ with the number j in the target sub-channel being transmitted. Prior probability $P_{apr}(S^*_{ij})$ depends on the statistics of the data generation source, and in practical terms it is assumed to be equal to ½. Probability P ($S^*_{ij}$) is the posterior probability of the receive signal $S^*_{ij}$, which is different from the prior probability $P_{apr}(S^*_{ij})$, and can be estimated at the receive side with high reliability, so P ($S^*_{ij}$)≈P ($S^*_{ij}$/y(t)). This is the best estimate of P ($S^*_{ij}$) in the white Gaussian noise channel. And based on this assumption, the expressions (6) and (7) can be rewritten as $$\begin{cases} P_{apr}(S_0) = P(S^*_{-10}/y(t)) \cdot P_{apr}(S^*_{00}) \cdot P(S^*_{10}/y(t)) \\ P_{apr}(S_1) = P(S^*_{-10}/y(t)) \cdot P_{apr}(S^*_{00}) \cdot P(S^*_{11}/y(t)) \\ P_{apr}(S_2) = P(S^*_{-11}/y(t)) \cdot P_{apr}(S^*_{00}) \cdot P(S^*_{10}/y(t)) \\ P_{apr}(S_3) = P(S^*_{-11}/y(t)) \cdot P_{apr}(S^*_{00}) \cdot P(S^*_{11}/y(t)) \end{cases} \quad (8)$$

$$\begin{cases} P_{apr}(S_4) = P(S^*_{-10}/y(t)) \cdot P_{apr}(S^*_{01}) \cdot P(S^*_{10}/y(t)) \\ P_{apr}(S_5) = P(S^*_{-10}/y(t)) \cdot P_{apr}(S^*_{01}) \cdot P(S^*_{11}/y(t)) \\ P_{apr}(S_6) = P(S^*_{-11}/y(t)) \cdot P_{apr}(S^*_{01}) \cdot P(S^*_{10}/y(t)) \\ P_{apr}(S_7) = P(S^*_{-11}/y(t)) \cdot P_{apr}(S^*_{01}) \cdot P(S^*_{11}/y(t)) \end{cases} \quad (9)$$

or when a different relationship exists between the information signal $S^*_{ij}$ and the transmission information signal $D_i$ (see expression (1)), a substitution of P ($S^*_{ij}$)=P ($D_i$=i/y(t)) is possible in expression (6) and (7), and expressions (6) and (7) can be expressed by the following expressions. Here P ($S^*_{ij}$) is a probability of the i-th sub-channel Di becoming j $$\begin{cases} P_{apr}(S_0) = P(D_{-1} = +1/y(t)) \cdot P_{apr}(S_{00}^*) \cdot P(S_1 = +1/y(t)) \\ P_{apr}(S_1) = P(D_{-1} = +1/y(t)) \cdot P_{apr}(S_{00}^*) \cdot P(D_1 = -1/y(t)) \\ P_{apr}(S_2) = P(D_{-1} = -1/y(t)) \cdot P_{apr}(S_{00}^*) \cdot P(S_1 = +1/y(t)) \\ P_{apr}(S_3) = P(D_{-1} = -1/y(t)) \cdot P_{apr}(S_{00}^*) \cdot P(D_1 = -1/y(t)) \end{cases} \quad (10)$$

$$\begin{cases} P_{apr}(S_4) = P(D_{-1} = +1/y(t)) \cdot P_{apr}(S_{01}^*) \cdot P(D_1 = +1/y(t)) \\ P_{apr}(S_5) = P(D_{-1} = +1/y(t)) \cdot P_{apr}(S_{01}^*) \cdot P(D_1 = -1/y(t)) \\ P_{apr}(S_6) = P(D_{-1} = -1/y(t)) \cdot P_{apr}(S_{01}^*) \cdot P(D_1 = +1/y(t)) \\ P_{apr}(S_7) = P(D_{-1} = -1/y(t)) \cdot P_{apr}(S_{01}^*) \cdot P(D_1 = -1/y(t)) \end{cases} \quad (11)$$

In the expressions (10) and (11) the prior probability $P_{apr}(S_j)$ (j=0, 1, 2, ... 7) of the receive signal $S_j$ in the target sub-channel is expressed by the cross-channel product of the prior transmission probability $P_{apr}(S^*_{ij})$ of the information signal $S^*_{ij}$, and the posterior probability of the information symbol $D_i$ received by the lower and upper adjacent channels being +1 or −1.

In the turbo receiver (maximum likely receiver) of the present invention, the sign of the receive information symbol $D_0$ of the target sub-channel is determined as follows. That is, the probability of the receive information symbol $D_0$ of the target sub-channel (number 0) being +1, which is $P(D_0=+1/y(t))$ and the probability of $D_0$ being −1, which is $P(D_0=-1/y(t))$ are determined respectively, and the sign of the receive information symbol $D_0$ is determined by comparing the values thereof, or comparing the difference of the logarithm thereof and the threshold value.

The posterior probability $P(D_0=j/y(t))$ of the receive information symbol $D_0$ of the target sub-channel being j can be acquired as the posterior probability of the signals of which $D_0$ is j being received. Therefore the posterior probability $P(D_0=+1/y(t))$ is a probability of the receive information signal $D_0$ of the target sub-channel becoming "0" (=+1) can be determined as follows. That is, the signal to transmit the information symbol of "0" (=+1) in the target sub-channel is $S_0$-$S_3$ according to the expressions (1) and (2), so the posterior probability $P(D_0=+1/y(t))$ of the receive information symbol $D_0$ of the target sub-channel becoming "0" (=+1) becomes the sum of the posterior probability to receive the signals $S_0$-$S_3$, which can be determined by the expression (12a). In the same way, the posterior probability $P(D_0=-1/y(t))$ of the receive information symbol $D_0$ of the target sub-channel becoming "0" (=−1) can be determined by the expression $$\begin{cases} P(D_0 = +1/y(t)) = k \cdot [P(S_0/y(t)) + P(S_1/y(t)) + P(S_2/y(t)) + P(S_3/y(t))] & (12a) \\ P(D_0 = -1/y(t)) = k \cdot [P(S_4/y(t)) + P(S_5/y(t)) + P(S_6/y(t)) + P(S_7/y(t))] & (12b) \end{cases}$$

If the expression (5) is applied to (12a) (where $k_0$=1), the expression (13) is established, $$P(D_0=+1/y(t))=k \cdot [P_{apr}(S_0) \cdot P(y(t)/S_0)+P_{apr}(S_1) \cdot P(y(t)/S_1)+k \cdot [P_{apr}(S_2) \cdot P(y(t)/S_2)+P_{apr}(S_3) \cdot P(y(t)/S_3)] \quad (13)$$

and if the expression (5) is applied to (12b) (where $k_0$=1), the expression (14) is established.

$$P(D_0=-1/y(t))=k \cdot [P_{apr}(S_4) \cdot P(y(t)/S_4)+P_{apr}(S_5) \cdot P(y(t)/S_5)+k \cdot [P_{apr}(S_6) \cdot P(y(t)/S_6)+P_{apr}(S_7) \cdot P(y(t)/S_7)] \quad (14)$$

If the expressions (10) and (11) are substituted for the expressions (13) and (14) and y(t) of $P(D_i=\pm1/y(t))$ is omitted for simplification (that is $P(D_i=\pm1/y(t))=P(D_i=\pm1)$), then the expressions (15) and (16) are acquired.

$$P(D_0 = +1/y(t)) = \quad (15)$$
$$k \cdot \begin{bmatrix} P(D_{-1} = +1) \cdot P_{apr}(S_{00}^*) \cdot P(D_1 = +1) \cdot P(y(t)/S_0) + \\ P(D_{-1} = +1) \cdot P_{apr}(S_{00}^*) \cdot P(D_1 = -1) \cdot P(y(t)/S_1) + \\ P(D_{-1} = -1) \cdot P_{apr}(S_{00}^*) \cdot P(D_1 = +1) \cdot P(y(t)/S_2) + \\ P(D_{-1} = -1) \cdot P_{apr}(S_{00}^*) \cdot P(D_1 = -1) \cdot P(y(t)/S_3) \end{bmatrix}$$

$$P(D_0 = -1/y(t)) = \quad (16)$$
$$k \cdot \begin{bmatrix} P(D_{-1} = +1) \cdot P_{apr}(S_{01}^*) \cdot P(D_1 = +1) \cdot P(y(t)/S_4) + \\ P(D_{-1} = +1) \cdot P_{apr}(S_{01}^*) \cdot P(D_1 = -1) \cdot P(y(t)/S_5) + \\ P(D_{-1} = -1) \cdot P_{apr}(S_{01}^*) \cdot P(D_1 = +1) \cdot P(y(t)/S_6) + \\ P(D_{-1} = -1) \cdot P_{apr}(S_{01}^*) \cdot P(D_1 = -1) \cdot P(y(t)/S_7) \end{bmatrix}$$

Then the expression (15) is further transformed, and the expressions (17a) and (17b) are acquired.

$$P(D_0=+1/y(t))=k \cdot P_{apr}(S_{00}^*) \cdot [P(D_{-1}=+1) \cdot P(D_1=+1) \cdot P(y(t)/S_0)+P(D_{-1}=+1) \cdot P(D_1=-1) \cdot P(y(t)/S_1)]+k \cdot P_{apr}(S_{00}^*) \cdot [P(D_{-1}=-1) \cdot P(D_1=+1) \cdot P(y(t)/S_2)+P(D_{-1}=-1) \cdot P(D_1=-1) \cdot P(y(t)/S_3)] \quad (17a)$$

$$P(D_0=+1/y(t))=k \cdot P_{apr}(S_{00}^*) \cdot [P(D_{-1}=+1) \cdot \{P(D_1=+1) \cdot P(y(t)/S_0)+P(D_1=-1) \cdot P(y(t)/S_1)\}]+k \cdot P_{apr}(S_{00}^*) \cdot [P(D_{-1}=-1) \cdot \{P(D_1=+1) \cdot P(y(t)/S_2)+P(D_1=-1) \cdot P(y(t)/S_3)\}] \quad (17b)$$

In the same way, the expression (16) is transformed, and the expressions (18a) and (18b) are acquired.

$$P(D_0=-1/y(t))=k \cdot P_{apr}(S_{01}^*) \cdot [P(D_{-1}=+1) \cdot P(D_1=+1) \cdot P(y(t)/S_4)+P(D_{-1}=+1) \cdot P(D_1=-1) \cdot P(y(t)/S_5)]+k \cdot P_{apr}(S_{00}^*) \cdot [P(D_{-1}=-1) \cdot P(D_1=+1) \cdot P(y(t)/S_6)+P(D_{-1}=-1) \cdot P(D_1=-1) \cdot P(y(t)/S_7)] \quad (18a)$$

$$P(D_0=-1/y(t))=k \cdot P_{apr}(S_{01}^*) \cdot [P(D_{-1}=+1) \cdot \{P(D_1=+1) \cdot P(y(t)/S_4)+P(D_1=-1) \cdot P(y(t)/S_5)\}]+k \cdot P_{apr}(S_{01}^*) \cdot [P(D_{-1}=-1) \cdot \{P(D_1=+1) \cdot P(y(t)/S_6)+P(D_1=-1) \cdot P(y(t)/S_7)\}] \quad (18b)$$

If the posterior probabilities $P(D_0=+1/y(t))$ and $P(D_0=-1/y(t))$ for the receive information symbol $D_0$ of the target sub-channel becoming "0" (=+1) and "1" (=−1) are determined as above, the values are compared or the difference of the logarithm thereof and the threshold value are compared so as to determined the sine (+1 or −1) of the receive information symbol.

Decision by comparing values

Whether the information symbol $D_0$ of the target sub-channel is +1 or −1 is decided by computing $P(D_0=+1/y(t))$ and $P(D_0=-1/y(t))$ first, then by using the expressions (19a) and (19b), $$\frac{P(D_0 = +1/y(t))}{P(D_0 = -1/y(t))} > 1 \tag{19a}$$

$$\frac{P(D_0 = +1/y(t))}{P(D_0 = -1/y(t))} < 1 \tag{19b}$$

and if (19a), then it is decided as $D_0=+1$, and if (19b), then it is decided as $D_0=-1$.

Decision by difference of logarithm

Whether the information symbol $D_0$ of the target sub-channel is +1 or -1 is decided by computing $\ln P(D_0=+1/y(t)) - \ln P(D_0=-1/y(t))$ (ln is a logarithm with an e base), then deciding the negative/positive of the result. If $$\ln P(D_0=+1/y(t)) - \ln P(D_0=-1/y(t)) > 0 \tag{19c},$$

then it is decided as $D_0=+1$, and if $$\ln P(D_0=+1/y(t)) - \ln P(D_0=-1/y(t)) < 0 \tag{19d},$$

then it is decided as $D_0=-1$.

Since the transmission symbol $D_0$ is statistically independent (no correlation) and is an equally distributed probability variable, the following expression is established.

$$\begin{cases} P_{apr}(S^*_{-10}) = P_{apr}(S^*_{00}) = P_{apr}(S^*_{+10}) = 1/2 \\ P_{apr}(S^*_{-11}) = P_{apr}(S^*_{01}) = P_{apr}(S^*_{+11}) = 1/2 \end{cases} \tag{20}$$

As expression (20) shows, the common multiplier in the expressions (17b) and (18b) does not affect the decision rule, so the expressions (17b) and (18b) become the expressions (21) and (22).

$$P(D_0=+1/y(t)) = P(D_{-1}=+1) \cdot \{P(D_1=+1) \cdot P(y(t)/S_0) + P(D_1=-1) \cdot P(y(t)/S_1)\} + P(D_{-1}=-1) \cdot \{P(D_1=+1) \cdot P(y(t)/S_2) + P(D_1=-1) \cdot P(y(t)/S_3)\} \tag{21}$$

$$P(D_0=-1/y(t)) = P(D_{-1}=+1) \cdot \{P(D_1=+1) \cdot P(y(t)/S_4) + P(D_1=-1) \cdot P(y(t)/S_5)\} + P(D_{-1}=-1) \cdot \{P(D_1=+1) \cdot P(y(t)/S_6) + P(D_1=-1) \cdot P(y(t)/S_7)\} \tag{22}$$

If the expressions (21) and (22) are transformed considering the algebraic sameness of the following expression, $$\ln(e^X + e^Y) = \frac{X+Y}{2} + \ln 2 + \ln \cosh\left(\frac{X-Y}{2}\right) \tag{a}$$

then the following expressions (23) and (24) are established.

$$\ln P(D_0 = +1/y(t)) = 1/2 \cdot \ln P(D_{-1} = +1) + \tag{23}$$
$$1/2 \cdot \ln \cdot \{P(D_1 = +1) \cdot P(y(t)/S_0) + P(D_1 = -1) \cdot P(y(t)/S_1)\} +$$
$$1/2 \cdot \ln P(D_{-1} = -1) +$$
$$1/2 \cdot \ln\{P(D_1 = +1) \cdot P(y(t)/S_2) + P(D_1 = -1) \cdot P(y(t)/S_3)\} +$$
$$\ln 2 + \ln \cosh\left\{\begin{array}{l} 1/2 \cdot \ln P(D_{-1} = +1) + 1/2 \cdot \ln\{P(D_1 = +1) \cdot \\ P(y(t)/S_0) + P(D_1 = -1) \cdot P(y(t)/S_1)\} - \\ 1/2 \cdot \ln P(D_{-1} = -1) + 1/2 \cdot \ln\{P(D_1 = +1) \cdot \\ P(y(t)/S_2) + P(D_1 = +1) \cdot P(y(t)/S_3)\} \end{array}\right\}$$

-continued $$\ln P(D_0 = -1/y(t)) = 1/2 \cdot \ln P(D_{-1} = +1) + \tag{24}$$
$$1/2 \cdot \ln \cdot \{P(D_1 = +1) \cdot P(y(t)/S_4) + P(D_1 = -1) \cdot P(y(t)/S_5)\} +$$
$$1/2 \cdot \ln P(D_{-1} = -1) +$$
$$1/2 \cdot \ln\{P(D_1 = +1) \cdot P(y(t)/S_6) + P(D_1 = -1) \cdot P(y(t)/S_7)\} +$$
$$\ln 2 + \ln \cosh\left\{\begin{array}{l} 1/2 \cdot \ln P(D_{-1} = +1) + 1/2 \cdot \ln\{P(D_1 = +1) \cdot \\ P(y(t)/S_4) + P(D_1 = -1) \cdot P(y(t)/S_5)\} - \\ 1/2 \cdot \ln P(D_{-1} = -1) + 1/2 \cdot \ln\{P(D_1 = +1) \cdot \\ P(y(t)/S_6) + P(D_1 = +1) \cdot P(y(t)/S_7)\} \end{array}\right\}$$

$$\ln P(D_0 = +1/y(t)) = \frac{A+B}{2} + \ln 2 + \ln \cosh\left(\frac{A-B}{2}\right) \tag{25}$$

$$\ln P(D_0 = -1/y(t)) = \frac{C+D}{2} + \ln 2 + \ln \cosh\left(\frac{C-D}{2}\right) \tag{26}$$

Here if the expressions (25) and (26) are used, then A, B, C and D become as follows.

$A = \ln P(D_{-1}=+1) + \ln \{P(D_1=+1) \cdot P(y(t)/S_0) + P(D_1=-1) \cdot P(y(t)/S_1)\}$ $B = \ln P(D_{-1}=-1) + \ln \{P(D_1=+1) \cdot P(y(t)/S_2) + P(D_1=-1) \cdot P(y(t)/S_3)\}$ $C = \ln P(D_{-1}=+1) + \ln \{P(D_1=+1) \cdot P(y(t)/S_4) + P(D_1=-1) \cdot P(y(t)/S_5)\}$ $D = \ln P(D_{-1}=-1) + \ln \{P(D_1=+1) \cdot P(y(t)/S_6) + P(D_1=-1) \cdot P(y(t)/S_7)\}$ If the expressions (25) and (26) are applied to the left side member of the expressions (19c) and (19d), the new decision expression becomes as follows.

$$\ln D_0 = \frac{A+B}{2} - \frac{C+D}{2} + \ln \cosh\left(\frac{A-B}{2}\right) - \ln \cosh\left(\frac{C-D}{2}\right) > / < 0 \tag{27}$$

By considering the relationship of $$P(y(t)/S_j) = \exp\left\{-\frac{1}{N_0}\int_0^T [y(t) - S_j]^2 dt\right\}$$

acquired by the expression (5) and the expression (4), each term constituting the new decision expression (27) can be rewritten as follows.

Here $\ln D_i = \ln P(D_i=+1) - \ln P(D_i=-1)$.

$$(A+B) - (C+D) = \tag{28}$$
$$\frac{2}{N_0}\left[\int_0^T y(t) \cdot S_0(t) dt + \int_0^T y(t) \cdot S_1(t) dt + \int_0^T y(t) \cdot S_2(t) dt + \int_0^T y(t) \cdot S_3(t) dt\right] +$$
$$\ln \cosh\left\{1/2 \cdot \left\{\ln D_1 + \frac{2}{N_0}\left[\int_0^T y(t) \cdot S_0(t) dt - \int_0^T y(t) \cdot S_1(t) dt\right] - \frac{E_0 - E_1}{N_0}\right\}\right\} -$$

-continued $$\ln \cosh \left\{ 1/2 \cdot \left\{ \ln D_1 + \frac{2}{N_0} \left[ \int_0^T y(t) \cdot S_0(t) dt - \int_0^T y(t) \cdot S_1(t) dt \right] + \frac{E_0 - E_1}{N_0} \right\} \right\} +$$

$$\ln \cosh \left\{ 1/2 \cdot \left\{ \ln D_1 + \frac{2}{N_0} \left[ \int_0^T y(t) \cdot S_2(t) dt - \int_0^T y(t) \cdot S_3(t) dt \right] - \frac{E_2 - E_3}{N_0} \right\} \right\} -$$

$$\ln \cosh \left\{ 1/2 \cdot \left\{ \ln D_1 + \frac{2}{N_0} \left[ \int_0^T y(t) \cdot S_2(t) dt - \int_0^T y(t) \cdot S_3(t) dt \right] + \frac{E_2 - E_3}{N_0} \right\} \right\}$$

In the above description, $\ln D_i = \ln P (D_i = +1/y(t)) - \ln P (D_i = -1/y(t))$ is the logarithmic difference of the posterior probabilities of the signal $D_i$ transmitted in the i-th sub-channel being +1 and −1 (soft decision value of the i-th sub-channel). It is assumed that the energy of the signal $S_j(t)$ is $E_j$, and $$E_j = \int_0^T S_j^2(t) dt.$$

(A−B), (C−D) of the expression (27) becomes as follows.

$$(A - B) = \ln D_{-1} + \qquad (29)$$
$$1/2 \cdot \left\{ \frac{2}{N_0} \left[ \int_0^T y(t) \cdot S_0(t) dt + \int_0^T y(t) \cdot S_1(t) dt - \int_0^T y(t) \cdot S_2(t) dt - \int_0^T y(t) \cdot S_3(t) dt \right] - \frac{\Delta E_\Sigma}{N_0} \right\} +$$

$$\ln \cosh \left\{ 1/2 \cdot \left\{ \ln D_1 + \frac{2}{N_0} \left[ \int_0^T y(t) \cdot S_0(t) dt - \int_0^T y(t) \cdot S_1(t) dt \right] - \frac{E_0 - E_1}{N_0} \right\} \right\} -$$

$$\ln \cosh \left\{ 1/2 \cdot \left\{ \ln D_1 + \frac{2}{N_0} \left[ \int_0^T y(t) \cdot S_2(t) dt - \int_0^T y(t) \cdot S_3(t) dt \right] + \frac{E_2 - E_3}{N_0} \right\} \right\}$$

$$(C - D) = \ln D_{-1} + \qquad (30)$$
$$1/2 \cdot \left\{ \frac{2}{N_0} \left[ \int_0^T y(t) \cdot S_0(t) dt + \int_0^T y(t) \cdot S_1(t) dt - \int_0^T y(t) \cdot S_2(t) dt - \int_0^T y(t) \cdot S_3(t) dt \right] + \frac{\Delta E_\Sigma}{N_0} \right\} +$$

$$\ln \cosh \left\{ 1/2 \cdot \left\{ \ln D_1 + \frac{2}{N_0} \left[ \int_0^T y(t) \cdot S_0(t) dt - \int_0^T y(t) \cdot S_1(t) dt \right] + \frac{E_0 - E_1}{N_0} \right\} \right\} -$$

$$\ln \cosh \left\{ 1/2 \cdot \left\{ \ln D_1 + \frac{2}{N_0} \left[ \int_0^T y(t) \cdot S_2(t) dt - \int_0^T y(t) \cdot S_3(t) dt \right] + \frac{E_2 - E_3}{N_0} \right\} \right\}$$

where $$\Delta E_\Sigma = \frac{(E_0 + E_1) - (E_2 + E_3)}{N_0} \qquad (31)$$

The expressions (27)-(30) define the optimum receiver structure of binary signals involving ICI. As the expressions (27)-(30) show, the decision information of the adjacent channels is used to decide the sign of the transmission information symbol D of a sub-channel. In the decision rule of the expressions (27)-(30), $\ln D_{-1}$ and $\ln D_{+1}$ indicate the logarithmic difference of the posterior probability of the information symbol in the lower sub-channel (ch−1) and the upper sub-channel (ch+1) becoming +1 and the posterior probability of that becoming −1. All calculations are in series, so when processing the data of the target sub-channel, the latest posterior probability from the adjacent channels can be used by repeat calculation.

As described above, the algorithm is created such that $\ln D_0$, which is the soft decision target value, is computed by the expressions (27)-(30), then "0" or "1" of the receive symbol of the target sub-channel is decided depending on the positive/negative of the soft decision target value $\ln D_0$.

(C) Configuration of Receiver

Figure 5:
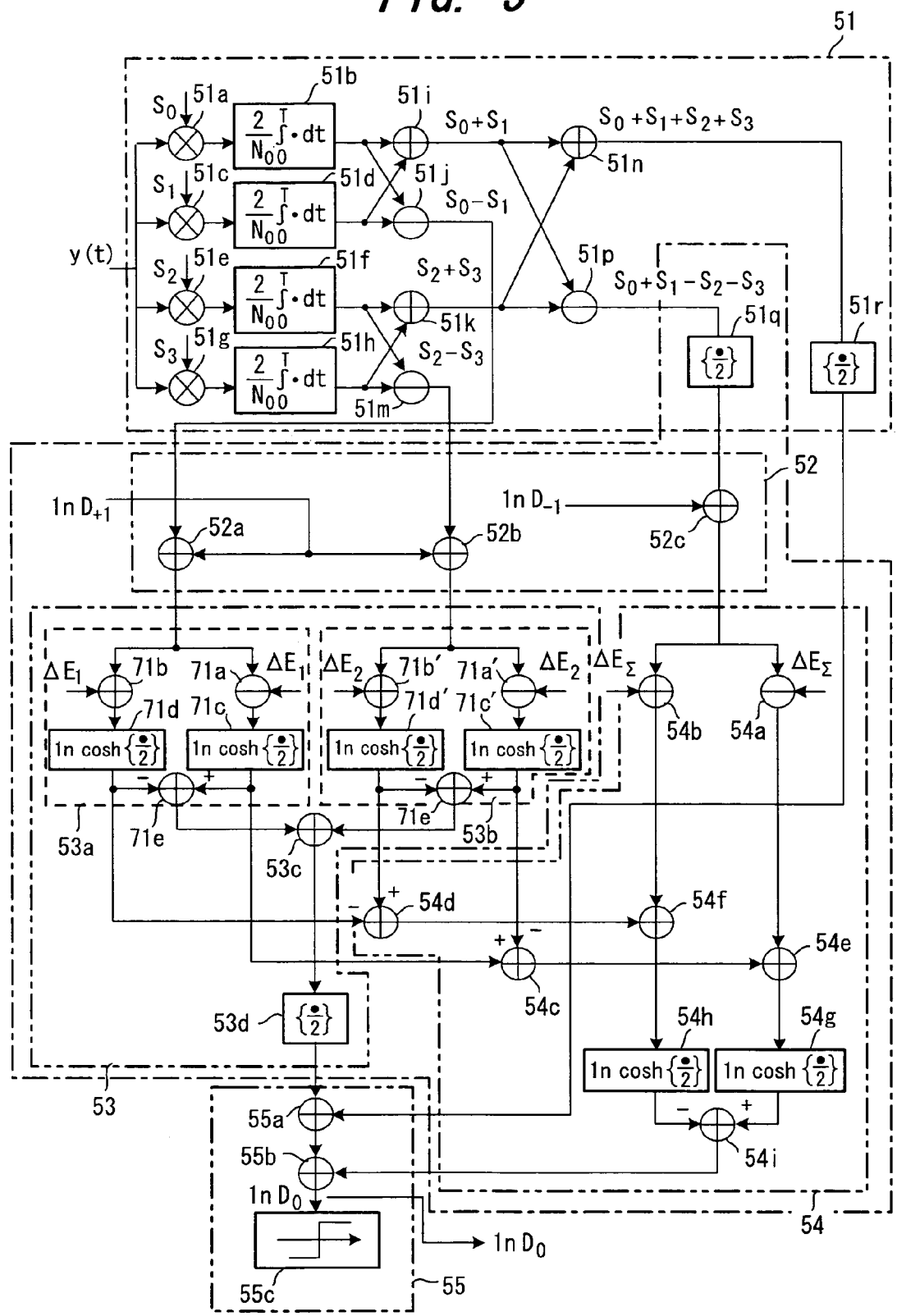
FIG. 5 is a block diagram depicting a receiver of a three sub-channel model.

FIG. 5 is a block diagram depicting a receiver of a three sub-channel model, that is, a receiver based on the maximum posterior probability using ICI (called a turbo receiver), and shows the configuration of only the receive unit of the target sub-channel, but the receive units of the other sub-channels also have the same configuration. This receive unit also has a configuration to execute the above mentioned algorithm.

The receiver 50 of the target sub-channel further comprises a correlation unit (can be a match fill) 51, another channel decision result operating unit 52, first and second non-linear units 53 and 54, and symbol decision unit 55.

The multiplier 51a and integrator 51b of the correlation unit 51 is a unit for computing $$\frac{2}{N_0} \int_o^T y(t) \cdot S_0(t) dt$$

of the decision expressions (28)-(30), the multiplier 51c and integrator 51d are units for computing $$\frac{2}{N_0} \int_o^T y(t) \cdot S_1(t) dt,$$

the multiplier 51e and integrator 51f are units for computing $$\frac{2}{N_0} \int_o^T y(t) \cdot S_2(t) dt,$$

and the multiplier 51g and integrator 51h are units for computing $$\frac{2}{N_0}\int_o^T y(t)\cdot S_3(t)dt.$$

The addition unit 51i adds the integration output of the integrators 51b and 51d, subtractor 51j subtracts the integration outputs of the integrators 51b and 51d, the addition unit 51k adds the integration outputs of the integrators 51f and 51h, and the subtractor 51m subtracts the integration outputs of the integrators 51f and 51h. The addition unit 51n adds the outputs of the addition units 51i and 51k, and outputs the first term of the right side member of the expression (28), that is $$\frac{2}{N_0}\int_o^T y(t)\cdot S_0(t)dt + \frac{2}{N_0}\int_0^T y(t)S_1(t)dt +$$
$$\frac{2}{N_0}\int_0^T y(t)S_2(t)dt + \frac{2}{N_0}\int_0^T y(t)S_3(t)dt$$

The subtraction unit $51_p$ subtracts the outputs of the addition units 51i and 51k, and outputs $$\frac{2}{N_0}\int_o^T y(t)\cdot S_0(t)dt + \frac{2}{N_0}\int_0^T y(t)S_1(t)dt -$$
$$\frac{2}{N_0}\int_0^T y(t)S_2(t)dt - \frac{2}{N_0}\int_0^T y(t)S_3(t)dt$$

The division units 51q and 51r divide the input signal ½, and output the result.

The other channel decision result operating unit 52 comprises the adders 52a-52c, which compute the following respectively.

$$\ln D_{+1} + \frac{2}{N_0}\int_o^T y(t)\cdot S_0(t)dt - \frac{2}{N_0}\int_0^T y(t)S_1(t)dt,$$
$$\ln D_{+1} + \frac{2}{N_0}\int_o^T y(t)\cdot S_2(t)dt - \frac{2}{N_0}\int_0^T y(t)S_3(t)dt,$$
$$\ln D_{-1} + \frac{1}{N_0}\int_o^T y(t)\cdot S_0(t)dt +$$
$$\frac{1}{N_0}\int_0^T y(t)S_1(t)dt - \frac{1}{N_0}\int_0^T y(t)\cdot S_2(t)dt - \frac{1}{N_0}\int_0^T y(t)S_3(t)dt$$

The first non-linear unit 53 is a unit for computing ln cosh of the second-fifth terms of the right side member of the expression (28), and comprises the first and second non-linear sections 53a and 53b. The addition units 71a and 71b of the first non-linear section 53a compute the content of { } of the second and third terms of the right side member of the expression (28) respectively. Here the $(E_0-E_1)/N_0=\Delta E_1$. ln cosh computing units 71c and 71d compute the second and third terms of the right side member of the expression (28) respectively, and the subtractor 71e subtracts the computing result of the ln cosh computing unit 71d from the computing result of the ln cosh computing unit 71c.

The addition units 71a' and 71b' of the second non-linear unit 53b compute the content of { } of the fourth and fifth terms of the right side member of the expression (28) respectively. Here the $(E_2-E_3)/N_0=\Delta E_2$ ln cosh computing units 71c' and 71d' compute the fourth and fifth terms of the right side member of the expression (28) respectively, and the subtractor 71e' subtracts the computing result of the ln cosh computing unit 71d' from the computing result of the ln cosh computing unit 71c', and outputs the result.

The addition unit 53c synthesizes the outputs of the adders 71e and 71e' and the division unit 53d divides the synthesized signal by ½, and outputs the computing results of the second-fifth terms of the expression (28).

The second non-linear unit 54 is a unit for computing the first-third terms of the right side member of the expressions (29) and (30). The addition units 54a and 54b compute the first term of the right side member of the expressions (29) and (30) respectively, the addition units 54c and 54d compute the second term and third term of the right side member of the expressions (29) and (30) respectively, the addition units 54e and 54f compute the right side member of the expressions (29) and (30) respectively, ln cosh computing units 54g and 54h compute ln cosh $$\frac{A-B}{2} \text{ and } \ln\cosh\frac{C-D}{2}$$

respectively, and the subtraction unit 54i computes the difference between the outputs of the ln cosh computing units 54g and 54h, and outputs $$\ln\cosh\frac{A-B}{2} - \ln\cosh\frac{C-D}{2}.$$

The adder 55a of the symbol decision unit 55 adds the output signal of the division unit 51r of the correlation unit 51 and the output signal of the non-linear unit 53, and outputs $$\frac{A-B}{2} - \frac{C-D}{2},$$

and the addition unit 55b generates the $lnD_0$ (soft decision target value) of the expression (27). The decision unit 55c decides whether $lnD_0$ is positive or negative, and decides that the receive symbol is "0" if positive, and that it is −1' if negative. The symbol decision unit 55 feeds back the computing result (soft decision target value) $lnD_0$ of the expression (27) to the other channel decision result operating units of the receive units 40 and 60 of the lower and upper adjacent sub-channels.

Figure 6:
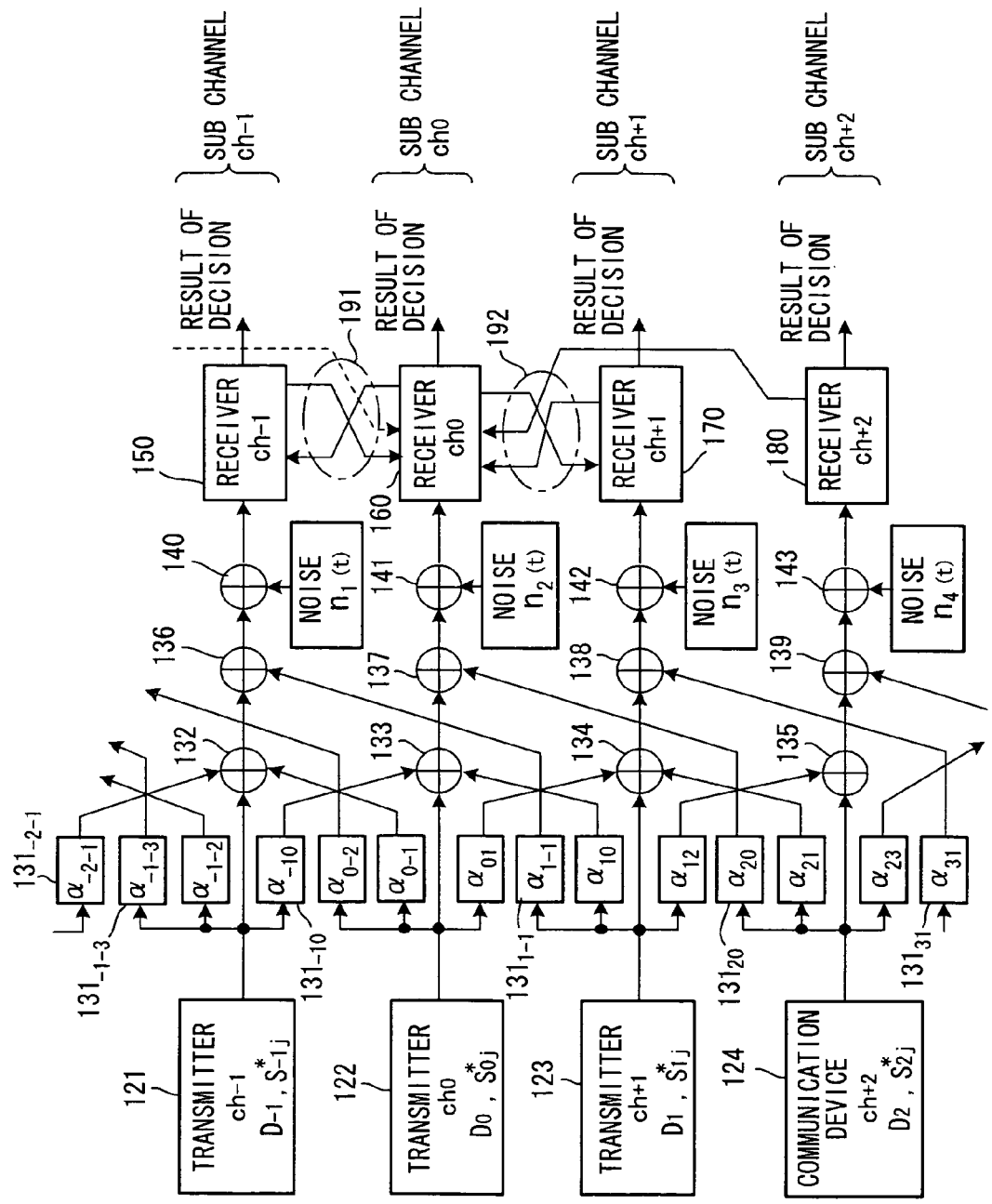
FIG. 6 is a general block diagram depicting a communication system for demodulating receive data using the interference between lower one sub-channel and upper two sub-channels, which shows the case where the number of sub-channels is 4 (four sub-channel model)

(D) General Configuration Example of Communication System of Present Invention having Four Sub-Channels FIG. 6 is a general block diagram depicting a communication system for demodulating receive data using the interference between lower one sub-channel and upper two sub-channels, comprising four transmitters 121, 122, 123 and 124 for transmitting data independently via four sub-channels, ch−1, ch0, ch+1 and ch+2, many cross-talk paths $131_{ij}$ having the coupling coefficient $\alpha_{ij}$ from the i-th sub-channel to the j-th sub-channel, four receivers 150, 160, 170 and 180 which are installed for each sub-channel for receiving data from the corresponding sub-channel and performing soft decision for the receive data, and means 191 and 192 for inputting the soft decision target value of each receiver to the receiver 160 of the target channel ch0. Means for inputting the other receivers is omitted in FIG. 6, but can be regarded as the same for the receiver 160. 132-139 and 140-143 are synthesizing units for synthesizing ICI signals and noises.

The receiver 160 of the sub-channel ch0 adjusts its own soft decision target value using the soft decision target values which were input from the receivers 150, 170 and 180 of the lower and upper sub-channels ch−1, ch+1 and ch+2, and decides "0" or "1" of the receive data based on the soft decision target value. In the same way, the other receivers as well adjust their own soft decision target values using the soft decision target values which were input from the receivers of the lower and upper sub-channels, and decides "0" or "1" of the receive data based on the adjusted soft decision target values.

(E) Receive Symbol Demodulation Algorithm in Four Sub-Channels

An algorithm for the receiver of the target sub-channel ch0 to demodulate the receive symbol in the communication system shown in FIG. 6 will be described.

The principle of the demodulation algorithm is deriving the value $\ln D_0$, which indicates the difference between the posterior probability $P(D_0=+1/y(t))$ of the information symbol received by the target sub-channel ch0 being "0" (=+1) and the posterior probability $P(D_0=-1/y(t))$ of the information symbol being "1" (=−1), just like the case of the three sub-channel model. Since the probability difference $\ln D_0$ of the target sub-channel is the difference between the posterior probability $P(D_0=+1/y(t))$ of the receive information symbol being "0" (=+1) and the posterior probability $P(D_0=-1/y(t))$ of the receive information symbol being "1" (=−1), the receive information of the target sub-channel can be decided as "0" if $\ln D_0 > 0$, and the receive information of the target sub-channel is "1" if $\ln D_0 < 0$.

It is assumed that binary information is transmitted as signal $S^*_{ij}(t)$ via two adjacent sub-channels. The index i in $S^*_{ij}(t)$ indicates the sub-channel number, and the index j is determined by the sign of the information symbol $D_i(i=-1, 0 \text{ or } 1)$ in the sub-channel i. In other words, if $D_i=+1$, then $j=0$ if $D_i=-1$, then $j=1$ Hereafter to simplify notation, the time dependency of $S^*_{ij}(t)$ in expressions is omitted. In other words, $S^*_{ij}(t)$ is denoted as $S^*_{ij}$.

As FIG. 6 shows, the signal of the target sub-channel affected by ICI from the lower and upper sub-channels is expressed as the linear coupling of the signals $S^*_{-1j}$, $S^*_{1j}$ and $S^*_{2j}$ transmitted by the upper and lower sub-channels, and the target channel signal $S^*_{0j}$ by the cross-talk coefficient $\alpha$. The cross-talk coefficient $\alpha$ is a value according to the leak of cross-talk. If the information symbol $D_0$ of the target channel is +1, then the receive signal $S_j$ (j=0-7) of the target channel becomes $$\begin{cases} S_0 = S^*_{00} + \alpha_{-10} \cdot S^*_{-10} + \alpha_{10} \cdot S^*_{10} + \alpha_{20} \cdot \\ S^*_{20}, D_0 = +1, D_{-1} = +1, D_1 = +1, D_2 = +1 \\ S_1 = S^*_{00} + \alpha_{-10} \cdot S^*_{-10} + \alpha_{10} \cdot S^*_{10} - \alpha_{20} \cdot \\ S^*_{20}, D_0 = +1, D_{-1} = +1, D_1 = +1, D_2 = -1 \\ S_2 = S^*_{00} + \alpha_{-10} \cdot S^*_{-10} - \alpha_{10} \cdot S^*_{10} + \alpha_{20} \cdot \\ S^*_{20}, D_0 = +1, D_{-1} = +1, D_1 = -1, D_2 = +1 \\ S_3 = S^*_{00} + \alpha_{-10} \cdot S^*_{-10} - \alpha_{10} \cdot S^*_{10} - \alpha_{20} \cdot \\ S^*_{20}, D_0 = +1, D_{-1} = +1, D_1 = -1, D_2 = -1 \end{cases} \quad (32)$$

$$\begin{cases} S_4 = S^*_{00} - \alpha_{-10} \cdot S^*_{-10} + \alpha_{10} \cdot S^*_{10} + \alpha_{20} \cdot \\ S^*_{20}, D_0 = +1, D_{-1} = -1, D_1 = +1, D_2 = +1 \\ S_5 = S^*_{00} + \alpha_{-10} \cdot S^*_{-10} + \alpha_{10} \cdot S^*_{10} - \alpha_{20} \cdot \\ S^*_{20}, D_0 = +1, D_{-1} = -1, D_1 = +1, D_2 = -1 \\ S_6 = S^*_{00} + \alpha_{-10} \cdot S^*_{-10} - \alpha_{10} \cdot S^*_{10} + \alpha_{20} \cdot \\ S^*_{20}, D_0 = +1, D_{-1} = -1, D_1 = -1, D_2 = +1 \\ S_7 = S^*_{00} + \alpha_{-10} \cdot S^*_{-10} - \alpha_{10} \cdot S^*_{10} - \alpha_{20} \cdot \\ S^*_{20}, D_0 = +1, D_{-1} = -1, D_1 = -1, D_2 = -1 \end{cases}$$

depending on whether the signals $D_{-1}$, $D_1$ and $D_2$ of the lower and upper sub-channels are +1 or −1.

j of the signal $S_j$ indicates the signal number. In the same way, if the information symbol $D_0$ of the target channel is −1, then the receive signal $S_j$ (j=8-15) of the target channel becomes $$\begin{cases} S_8 = -S^*_{00} + \alpha_{-10} \cdot S^*_{-10} + \alpha_{10} \cdot S^*_{10} + \alpha_{20} \cdot \\ S^*_{20}, D_0 = -1, D_{-1} = +1, D_1 = +1, D_2 = +1 \\ S_9 = -S^*_{00} + \alpha_{-10} \cdot S^*_{-10} + \alpha_{10} \cdot S^*_{10} - \alpha_{20} \cdot \\ S^*_{20}, D_0 = -1, D_{-1} = +1, D_1 = +1, D_2 = -1 \\ S_{10} = -S^*_{00} + \alpha_{-10} \cdot S^*_{-10} - \alpha_{10} \cdot S^*_{10} + \alpha_{20} \cdot \\ S^*_{20}, D_0 = -1, D_{-1} = +1, D_1 = -1, D_2 = +1 \\ S_{11} = -S^*_{00} + \alpha_{-10} \cdot S^*_{-10} - \alpha_{10} \cdot S^*_{10} - \alpha_{20} \cdot \\ S^*_{20}, D_0 = -1, D_{-1} = +1, D_1 = -1, D_2 = -1 \end{cases} \quad (33)$$

$$\begin{cases} S_{12} = -S^*_{00} - \alpha_{-10} \cdot S^*_{-10} + \alpha_{10} \cdot S^*_{10} + \alpha_{20} \cdot \\ S^*_{20}, D_0 = -1, D_{-1} = -1, D_1 = +1, D_2 = +1 \\ S_{13} = -S^*_{00} - \alpha_{-10} \cdot S^*_{-10} + \alpha_{10} \cdot S^*_{10} - \alpha_{20} \cdot \\ S^*_{20}, D_0 = -1, D_{-1} = -1, D_1 = +1, D_2 = -1 \\ S_{14} = -S^*_{00} - \alpha_{-10} \cdot S^*_{-10} - \alpha_{10} \cdot S^*_{10} + \alpha_{20} \cdot \\ S^*_{20}, D_0 = -1, D_{-1} = -1, D_1 = -1, D_2 = +1 \\ S_{15} = -S^*_{00} - \alpha_{-10} \cdot S^*_{-10} - \alpha_{10} \cdot S^*_{10} - \alpha_{20} \cdot \\ S^*_{20}, D_0 = -1, D_{-1} = -1, D_1 = -1, D_2 = -1 \end{cases}$$

depending on whether the signals $D_{-1}$, $D_1$ and $D_2$ of the lower and upper sub-channels area +1 or −1.

After introducing ICI, $S_j$ (j=0, 1, 2, ... 15) is used as 16 signals at the input of the receiver of each sub-channel. The index j of $S_j$ in the expressions (32) and (33) indicates the signal number, and is determined by pairing the symbols $D_{-1}$, $D_1$, $D_2$ and $D_0$ in the lower sub-channel, upper sub-channel and target sub-channel.

By considering the following [1] and [2], the algorithm for optimum reception can be further developed. In other words, by considering [1] that the signs of some information signals are the opposite, that is $S^*_{-10}=-S^*_{-11}$, $S^*_{00}=-S^*_{01}$, $S^*_{10}=-S^*_{11}$, and $S^*_{-20}=-S^*_{21}$, and [2] to transmit information signals a same signal is used for the lower, upper and target sub-channels, that is, $S^*_{-10}=S^*_{00}=S^*_{10}=S^*_{20}$ and $S^*_{-11}=S^*_{01}=S^*_{11}=S^*_{21}$, the algorithm for optimum reception can be further developed. The latter [2] indicates that all the sub-channels have the same value and the information signals of all the sub-channels have no difference in amplitude, waveform and energy. In this case, the signals of the expressions (32) and (33) in each sub-channel become a pair, having opposite signs, as shown in the following expressions.

$$S_0 = -S_{15}, S_1 = -S_{14}, S_2 = -S_{13}, S_3 = -S_{12}$$

$$S_4 = -S_{11}, S_5 = -S_{10}, S_6 = -S_9, S_7 = -S_8 \quad (34)$$

Hereafter this case can be considered in the same way as the three sub-channel model. In other words, just like the case of the three sub-channel model, the posterior probabilities P $(D_0=+1/y(t))$ and P $(D_0=-1/y(t))$ of the receive information symbol $D_0$ of the target sub-channel becoming "0" (=+1) and "1" (=−1) are determined. If these are determined, the sign (+1 or −1) of the receive symbol can be determined by comparing these values or comparing the difference of the logarithms thereof and the threshold value. In other words, to determine whether the information symbol $D_0$ of the target sub-channel is +1 or −1, $$\frac{P(D_0 = +1/y(t))}{P(D_0 = -1/y(t))}$$

is computed first and compared with 1, and if the result is greater than 1, it is decided that $D_0=+1$, and if the result is smaller than 1, it is decided that ln P $(D_0=+1/y(t))$−ln P $(D_0=-1/y(t))$ is computed and then the negative or positive of the result is decided. In other words, if positive it is decided that $D_0=+1$, and if negative it is decided that $D_0=-1$. y(t) is a synthesized signal (y (t)=$S_j$+n(t)) of the signal series $S_j$ involving ICI and the white Gaussian noise n (t) having spectrum power intensity $N_0$.

In the case of a four sub-channel model, $$\ln P(D_0 = +1/y(t)) = \frac{a+b}{2} + \ln 2 + \ln \cosh\left(\frac{a-b}{2}\right) \quad (35)$$

$$\ln P(D_0 = -1/y(t)) = \frac{c+d}{2} + \ln 2 + \ln \cosh\left(\frac{c-d}{2}\right) \quad (36)$$

Here a, b, c and d are as shown in the following expressions.

$$a = \ln P(D_{-1} = +1) + \quad (37)$$

$$0.5 \left\{ \begin{array}{l} \ln P(D_1 = +1) + \ln(P(D_2 = +1) \cdot \\ P(y(t)/S_0) + P(D_2 = -1) \cdot P(y(t)/S_1)) + \\ \ln P(D_1 = -1) + \ln(P(D_2 = +1) \cdot \\ P(y(t)/S_2) + P(D_2 = -1) \cdot P(y(t)/S_3)) \end{array} \right\} +$$

$$\ln 2 + \ln \cosh \left\{ 0.5 \cdot \left\{ \begin{array}{l} \ln\ P(D_1 = +1) - \ln\ P(D_1 = -1) + \\ \ln\ \{P(D_2 = +1) \cdot P(y(t)/S_0) + \\ P(D_2 = -1) \cdot P(y(t)/S_1)\} - \\ \ln\{P(D_2 = +1) \cdot P(y(t)/S_2) + \\ P(D_2 = -1) \cdot P(y(t)/S_3)\} \end{array} \right\} \right\}$$

-continued $$b = \ln P(D_{-1} = +1) + \quad (38)$$

$$0.5 \left\{ \begin{array}{l} \ln P(D_1 = +1) + \ln(P(D_2 = +1) \cdot \\ P(y(t)/S_4) + P(D_2 = -1) \cdot P(y(t)/S_5)) + \\ \ln P(D_1 = -1) + \ln(P(D_2 = +1) \cdot \\ P(y(t)/S_6) + P(D_2 = -1) \cdot P(y(t)/S_7)) \end{array} \right\} +$$

$$\ln 2 + \ln \cosh \left\{ 0.5 \cdot \left\{ \begin{array}{l} \ln\ P(D_1 = +1) - \ln\ P(D_1 = -1) + \\ \ln\ \{P(D_2 = +1) \cdot P(y(t)/S_4) + \\ P(D_2 = -1) \cdot P(y(t)/S_5)\} - \\ \ln\{P(D_2 = +1) \cdot P(y(t)/S_6) + \\ P(D_2 = -1) \cdot P(y(t)/S_7)\} \end{array} \right\} \right\}$$

$$c = \ln P(D_{-1} = +1) + \quad (39)$$

$$0.5 \left\{ \begin{array}{l} \ln P(D_1 = +1) + \ln(P(D_2 = +1) \cdot \\ P(y(t)/S_8) + P(D_2 = -1) \cdot P(y(t)/S_9)) + \\ \ln P(D_1 = -1) + \ln(P(D_2 = +1) \cdot \\ P(y(t)/S_{10}) + P(D_2 = -1) \cdot P(y(t)/S_{11})) \end{array} \right\} +$$

$$\ln 2 + \ln \cosh \left\{ 0.5 \cdot \left\{ \begin{array}{l} \ln\ P(D_1 = +1) - \ln\ P(D_1 = -1) + \\ \ln\ \{P(D_2 = +1) \cdot P(y(t)/S_8) + \\ P(D_2 = -1) \cdot P(y(t)/S_9)\} - \\ \ln\{P(D_2 = +1) \cdot P(y(t)/S_{10}) + \\ P(D_2 = -1) \cdot P(y(t)/S_{11})\} \end{array} \right\} \right\}$$

$$c = \ln P(D_{-1} = +1) + \quad (40)$$

$$0.5 \left\{ \begin{array}{l} \ln P(D_1 = +1) + \ln(P(D_2 = +1) \cdot \\ P(y(t)/S_{12}) + P(D_2 = -1) \cdot P(y(t)/S_{13})) + \\ \ln P(D_1 = -1) + \ln(P(D_2 = +1) \cdot \\ P(y(t)/S_{14}) + P(D_2 = -1) \cdot P(y(t)/S_{15})) \end{array} \right\} +$$

$$\ln 2 + \ln \cosh \left\{ 0.5 \cdot \left\{ \begin{array}{l} \ln\ P(D_1 = +1) - \ln\ P(D_1 = -1) + \\ \ln\ \{P(D_2 = +1) \cdot P(y(t)/S_{12}) + \\ P(D_2 = -1) \cdot P(y(t)/S_{13})\} - \\ \ln\{P(D_2 = +1) \cdot P(y(t)/S_{14}) + \\ P(D_2 = -1) \cdot P(y(t)/S_{15})\} \end{array} \right\} \right\}$$

Finally ln $D_0$ is given by the following expression using the expressions (35) and (36).

$$\ln D_0 = \frac{a+b}{2} - \frac{c+d}{2} + \ln \cosh\left(\frac{a-b}{2}\right) - \ln \cosh\left(\frac{c-d}{2}\right) \quad (41)$$

(F) Receiver of the Present Invention

Figure 7:
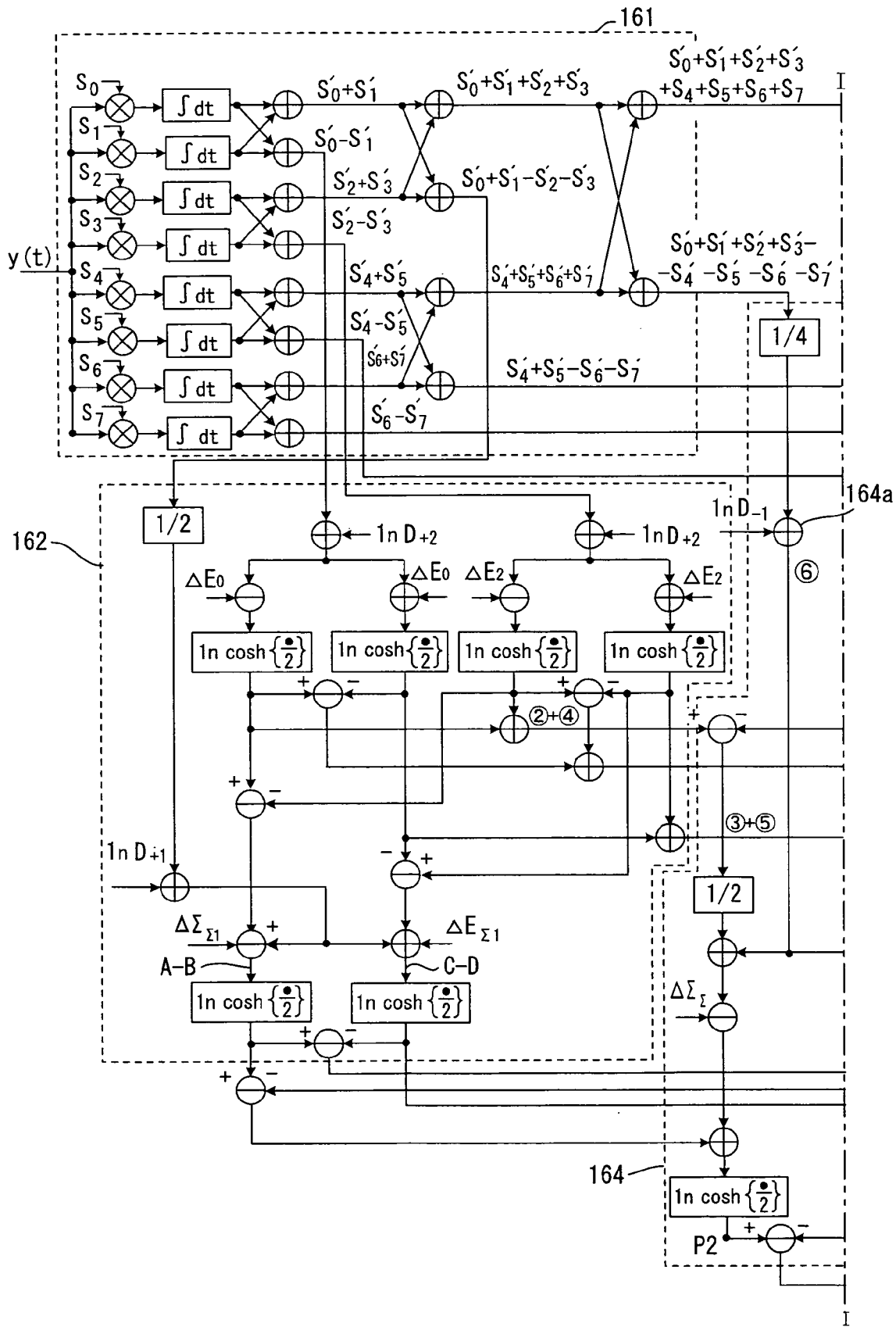
FIG. 7 is a first block diagram depicting a receiver in the case when the cross-talk from upper two sub-channels and lower one sub-channel exist, and indicates the configuration of the left side of the receiver.
Figure 8:
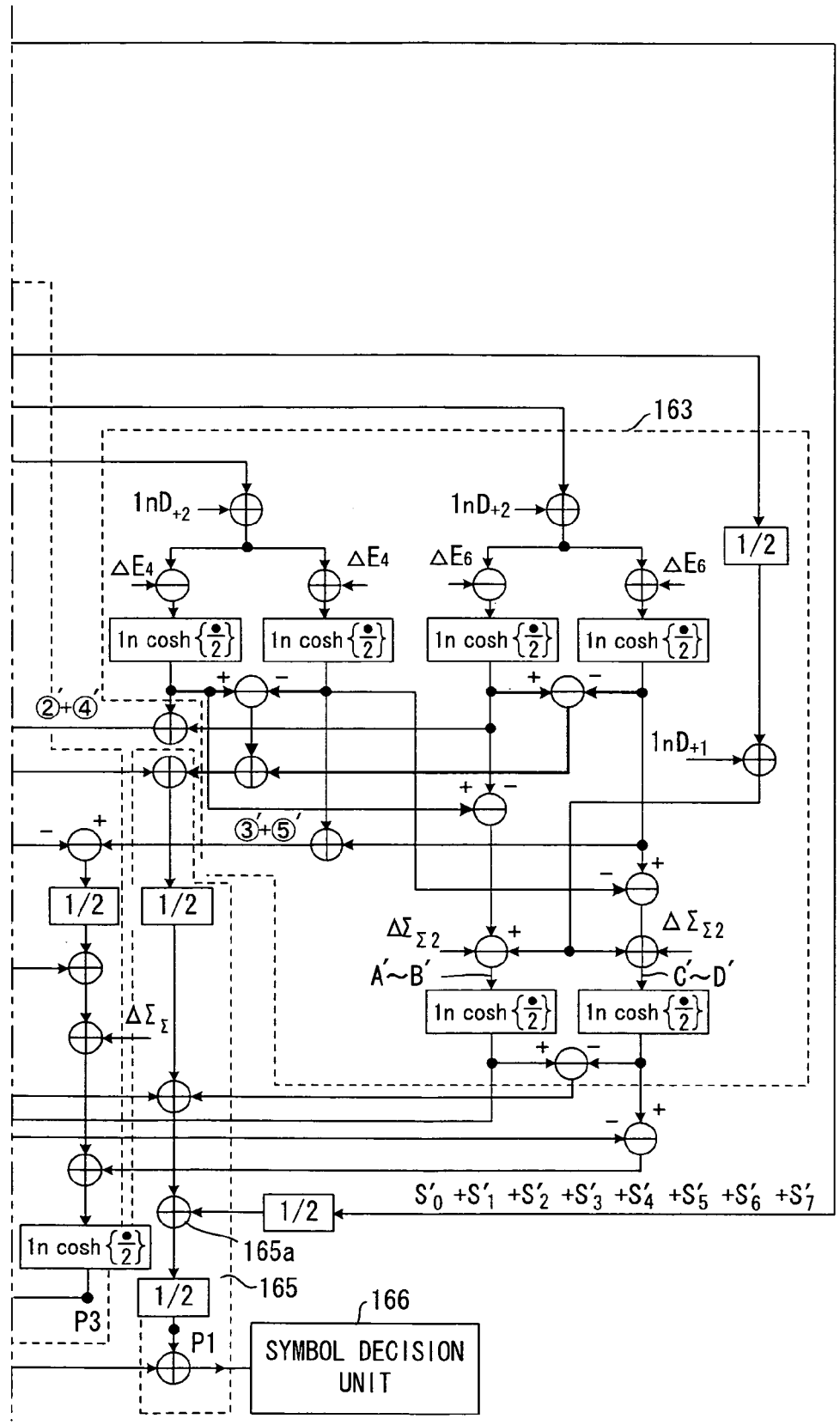
FIG. 8 is a second block diagram depicting a receiver in the case when the cross-talk from upper two sub-channels and lower one sub-channel exist, and indicates the configuration of the right side of the receiver.

FIG. 7 and FIG. 8 are block diagrams depicting a receiver of the target sub-channel of the present invention in the case when the cross-talk from upper two sub-channels and lower one sub-channel exist, which are separated in the figures by a dash and dotted line, and implements the computation of the right side member of the expression (41). FIG. 7 shows the configuration of the left side of the receiver, and FIG. 8 shows the right side thereof. If the receiver in FIG. 7 and FIG. 8 is the receiver of the target channel ch0, this receiver has a configuration combining the receiver of the three sub-channel model which receives cross-talk from the channels ch+1 and ch+2, and the receiver of the two sub-channel model which receives cross-talk from the channel ch1, and the expression (41) becomes the sum of the values at the points P1, P2 and P3 in FIG. 7 and FIG. 8.

The receiver 160 of the target sub-channel comprises a correlation unit 161, first-third computing units 162-164, synthesizing unit 165 and decision unit 166. In the figures, ∫dt is an integrator for computing $$\frac{2}{N_0}\int_o^T y(t)\cdot S_i(t)dt.$$

$\ln D_i = \ln P(D_i=+1) - \ln P(D_i=-1)$ is the logarithmic difference of the posterior probabilities of the signal Di transmitted by the i-th sub-channel (i=−1, +1, +2) becoming +1 or −1 (soft decision value in the i-th sub-channel). Here the energy of the signal $S_j$ (t) is $E_j$, which is given by $$E_j = \int_0^T S_j^2(t)dt.$$

Also $$\Delta E_\Sigma = \frac{E_0 + E_1 - E_2 - E_3}{N_0},$$

$$\Delta E_\Sigma = \frac{E_4 + E_5 - E_6 - E_7}{N_0},$$

$$\Delta E_\Sigma = \frac{E_0 + E_1 + E_2 + E_3 - E_4 - E_5 - E_6 - E_7}{N_0}$$

$$\Delta E_0 = \frac{E_0 - E_1}{N_0}, \Delta E_2 = \frac{E_2 - E_3}{N_0},$$

$$\Delta E_4 = \frac{E_4 - E_5}{N_0}, \Delta E_6 = \frac{E_6 - E_7}{N_0}$$

The correlation unit 161 is comprised of the computing units (multiplier and integrator) for computing $$\frac{2}{N_0}\int_o^T y(t)\cdot S_0(t)dt \sim \frac{2}{N_0}\int_o^T y(t)\cdot S_7(t)dt$$

and the addition/subtraction circuit for computing $S_0'+S_1'$, $S_0'-S_1'$, $S_2'+S_3'$, $S_2'-S_3'$ . . . , $\Sigma S_j'$ (j=0-7) when $$\frac{2}{N_0}\int_o^T y(t)\cdot S_0(t)dt \sim \frac{2}{N_0}\int_o^T y(t)\cdot S_7(t)dt$$

are expressed as $S_0'$, $S_1'$, $S_7'$ respectively.

The first computing unit 162 has a configuration the same as the configuration enclosed by a dash and dotted line in FIG. 5, and computes the second-fifth terms of the right side member of the expression (28) and expressions (29) and (30) for the signals $S_0$ (t), . . . $S_3$ (t) out of the signals $S_0$ (t), $S_1$ (t), . . . $S_7$ (t). In the addition unit 165a of the synthesizing unit 165, the first term of the right side member (=$S_0'+S_1'+S_2'+S_3'$) of the expression (28) is added, and computation of the expression (29) completes.

The second computing unit 163 has the same configuration as the configuration enclosed by the dash and dotted line in FIG. 5, and computes the second to fifth terms of the right side member of the expression (28) and the expressions (29) and (30) for the signals $S_4$ (t), . . . $S_7$ (t) out of the signals $S_0$ (t), $S_1$ (t), . . . $S_7$ (t). However in the expressions (28), (29) and (30), $S_0$ (t) . . . $S_3$ (t) are replaced with $S_4$ (t) . . . $S_7$ (t). In the addition unit 165a of the synthesizing unit 165, the first term of the right side member(=$S_4'+S_5'+S_6'+S_7'$) of the expression (28) is added, and computation for the expression (29) completes.

The synthesizing unit 165 synthesizes the computing result of the right side member of the expression (27) for the signals $S_0$ (t) . . . $S_3$ (t), that is $$\frac{A+B}{2} - \frac{C+D}{2} + \ln \cosh\left(\frac{A-B}{2}\right) - \ln \cosh\left(\frac{C-D}{2}\right) \quad (42)$$

and the computing result of the right side member of the expression (27) for the signals $S_4$ (t) . . . $S_7$ (t), that is $$\frac{A'+B'}{2} - \frac{C'+D'}{2} + \ln \cosh\left(\frac{A'-B'}{2}\right) - \ln \cosh\left(\frac{C'-D'}{2}\right) \quad (43)$$

and adds the computing result of the third computing unit 164 to the synthesized result (value at the point P1 in the figure), and inputs it to the decision unit 166 as ln $D_0$ of the expression (41).

The third computing unit 164 corrects the computing result based on the soft decision data ln $D_{-1}$ of the lower sub-channel ch−1, and performs predetermined computation on the correction result, and inputs it to the synthesizing unit 165.

If the values of the first-fifth terms of the expression (28) for the signals $S_0$ (t), $S_1$ (t), $S_2$ (t) and $S_3$ (t) are expressed as ①-⑤, the values of the first-fifth terms of the expression (28) for the signals $S_4$(t) $S_5$ (t), $S_6$ (t) and $S_7$ (t) are expressed as ①'-⑤', and the output of the soft decision data ln $D_{-1}$ operating unit 164a is expressed as ⑥, then the value of the point P2 becomes ln cosh(½)·[{(②+④−②'−④')/2+⑥−$\Delta\Sigma_\Sigma$}+ln cosh{(A−B)/2}−ln cosh{(A'−B')/2}] (44)

and the value of the point P3 becomes ln cosh(½)·[{(③'+⑤'−③−⑤)/2+⑥+$\Delta\Sigma_\Sigma$}+ln cosh{(C'−D')/2}−ln cosh{(C−D)/2}] (45)

Therefore ln $D_0$ (soft decision target value) after synthesizing the values of the points P1, P2 and P3, that is ln $D_0$ (soft decision target value) given by the expression (41) is input to the symbol decision unit 166. Here ln $D_0$=(42)+(43)+(44)+(45).

The symbol decision unit 166 decides the positive/negative of the ln $D_0$ (soft decision target value), and if positive the receive symbol is decided as "0", and if negative it is decided as "1". Also the symbol decision unit 166 feeds back the ln $D_0$ (soft decision target value) to the decision result operating unit of the receive units 150, 170 and 180 of the lower and upper sub-channels.

As described above, in the multi-carrier communication system for transmitting/receiving signals via at least four sub-channels, the receiver of the target sub-channel ch0 adjusts its own bit decision target value ln $D_0$ using the soft decision target values ln $D_{+1}$, ln $D_{+2}$ and ln $D_{-1}$, in the sub-channels other than the target sub-channel, and decides the receive data based on this soft decision target value.

(G) Similarity with a Turbo Decoder

The above mentioned demodulation algorithm of the receive data of the present invention is similar to the turbo decoder of the turbo codes written in the following document.

Document: M. C. Valenti and B. D. Woerner: "Variable latency turbo codes for wireless multimedia applications", Proc. Int. Symposium on Turbo codes and Related Topics, Brest, France, September 1997, pp. 216-219.

Because of the similarity with the turbo decoder, let us call the algorithm of the present invention a "turbo receiver". In the turbo decoder, each decoder transfers the information to the other decoders, and refines the estimated posterior probability sequentially using the information derived by the other decoders. In the same way, in the algorithm of the present invention as well, the information derived from one sub-channel is used to refine the estimated posterior probability of the other channel after non-linear processing, and the information derived from the latter sub-channel is used to refine the estimated posterior probability of the former channel. If an individual decoder output is hard bit decision (hard decision) format in the turbo decoder, sharing information has few advantages. A hard bit decision is similar to the decision feedback equalizer proposed by Viterbo and Fazel in the above mentioned Document 2 for canceling ICI. Here the hard bit decision is executed only at the end of a repeat.

This structural similarity is because of the following reasons. In other words, in the turbo receiver, just like the case of turbo codes, the same information is transmitted on the sub-channel having unrelated noise due to the presence of ICI. Depending on the behavior of this unrelated noise, the estimation (or the reliability of the decision of) posterior probability can be improved using the estimated posterior probability derived from other sub-channels.

Just like the case of the repeat turbo decoder, the algorithm of the present invention performs one or more repeats before the final decision for the received information. If the data is an equally distributed probability variable at the first step, that is when a decision from other channels cannot be used, $P(D_{-1}=+1)=½, P(D_{-1}=-1)=½$ $P(D_{+1}=+1)=½, P(D_{+1}=-1)=½$ $P(D_{+2}=+1)=½, P(D_{+2}=-1)=½$ can be set for the first sub-channel. This setting is the best. Therefore in the first step, the difference $\ln D_{-1}$ of the posterior probabilities in the low sub-channel ch-1 is regarded as 0. According to the same concept, in the upper sub-channels ch+1 and ch+2, the difference of the posterior probabilities is regarded as $\ln D_{+1}=0$ and $\ln D_{+2}=0$. By calculating the expressions (35)-(36) and (41), assuming $\ln D_{-1}=\ln D_1=\ln D_2=0$, the first estimate of $\ln D_0$, which was unknown, can be acquired. In the same way, in an N sub-channel communication system, the lower sub-channel computes $\ln D_{-1}$ assuming $\ln D_{-2}=\ln D_0=\ln D_1=0$, and the upper sub-channel computes $\ln D_1$ assuming $\ln D_3=\ln D_2=\ln D_0=0$ at the first repeat according to the algorithm of the present invention. In the second step, $\ln D_{-1}$, $\ln D_1$ and $\ln D_2$ acquired in the previous step are applied to the decision expressions (35)-(36) and (41) to compute the new estimate value of the posterior probability of the target sub-channel. By this, the output of one sub-channel receiver is used as the prior probability for the other receivers.

Figure 9:
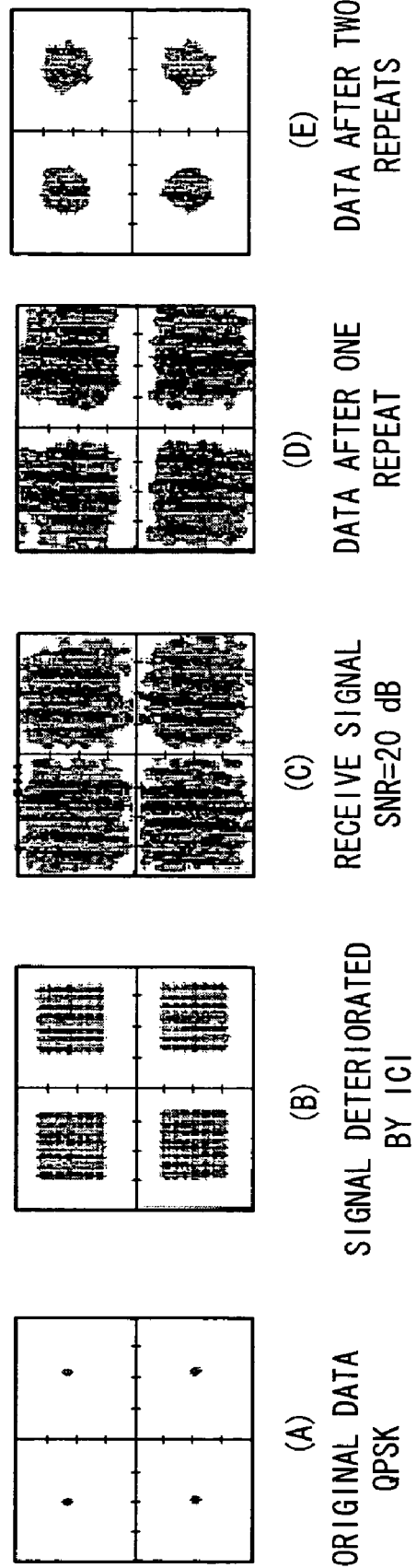
FIG. 9 is a diagram depicting the constellation of the target sub-channel according to the number of repeats according to the turbo receiver of the present invention.

FIG. 9 shows the constellation of the target channel in the communication system where N=64, and is a case when QPSK modulation with the S/N ratio=20 dB is performed after a different number of times of repeats. The cross channel leak coefficient here is $\alpha_{-10}=0.25$, $\alpha_{10}=0.15$ and $\alpha_{20}=0.075$. (A) is QPSK modulated original data, (B) are signals deteriorated by ICI, (C) is a receive signal with an S/N ratio=20 dB, (D) is the receive data after one repeat according to the present invention, and (E) is the constellation of the receive data after the second repeat according to the present invention.

As shown here, according to the present invention, the dispersion in constellation is small, and the BER is improved to become smaller. As the number of repeats increases, the dispersion in constellation decreases further, and BER is further improved.

(H) Noise Immunity and Simulation Results

Figure 10:
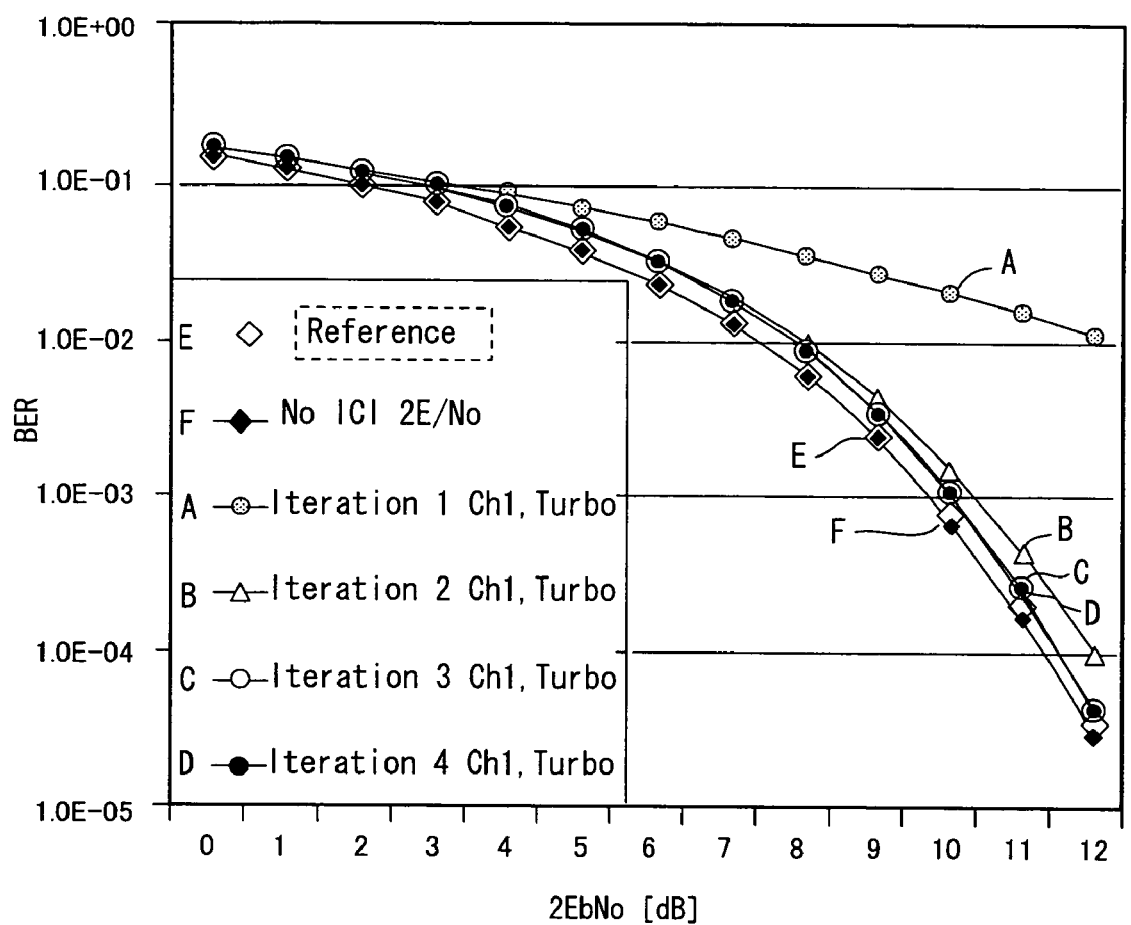
FIG. 10 is a characteristic diagram depicting the average BER performance of the turbo receiver of the present invention and a conventional matched filter base receiver.

In order to prove the validity of the non-linear signal processing of the present invention, computer simulation was performed for the receiver of the present invention and conventional matched filter receiver. FIG. 10 shows the average BER performance in the receiver of the present invention, and the matched filter receiver as a function of $2Eb/N_0$ in the case of $\alpha_{-10}=0.25$, $\alpha_{10}=0.15$ and $\alpha_{20}=0.075$ (see simulation results A-D). $Eb/N_0$ is a ratio of the average receive signal energy Eb against the background noise power spectrum intensity $N_0$ per bit. As a reference, the simulation result E of the receiver of the present invention in the case of $\alpha_{-10}=\alpha_{10}=\alpha_{20}=0$ without ICI (equivalent to the matched filter receiver), is shown in FIG. 9. Also as a reference, the BER simulation result F of the matched filter receiver when ICI does not exist, which was calculated using the expression (46), is shown.

$$P_{err} = \frac{1}{2} \cdot \mathrm{erfc}(\sqrt{0.5 \cdot \mathrm{SNR}}) \quad (46)$$

where erfc $$(x) = \mathrm{erfc}(x) = 1 - \mathrm{erf}(x) = \frac{2}{\sqrt{\pi}} \int_x^\infty e^{-t^2} dt$$

The BER performance acquired by computer simulation and the BER performance calculated using the expression (46) match well. As the plot in FIG. 10 shows, the BER of the receiver of the present invention is not different from the BER of the conventional matched filter base receiver acquired using the expression (46) if ICI does not exist. The latter BER is indicated as "Reference" (E) in FIG. 10. When ICI exists (in the case of $\alpha_{01}=0.25$, $\alpha_{0-1}=0.15$ and $\alpha_{20}=0.075$), the performance of the conventional device (repeat once, characteristic A), which does not perform non-linear processing, is not as good as the receiver of the present invention, and this is particularly obvious in a high $Eb/N_0$, as the simulation results shows.

(I) Application to DMT System

Figure 11:
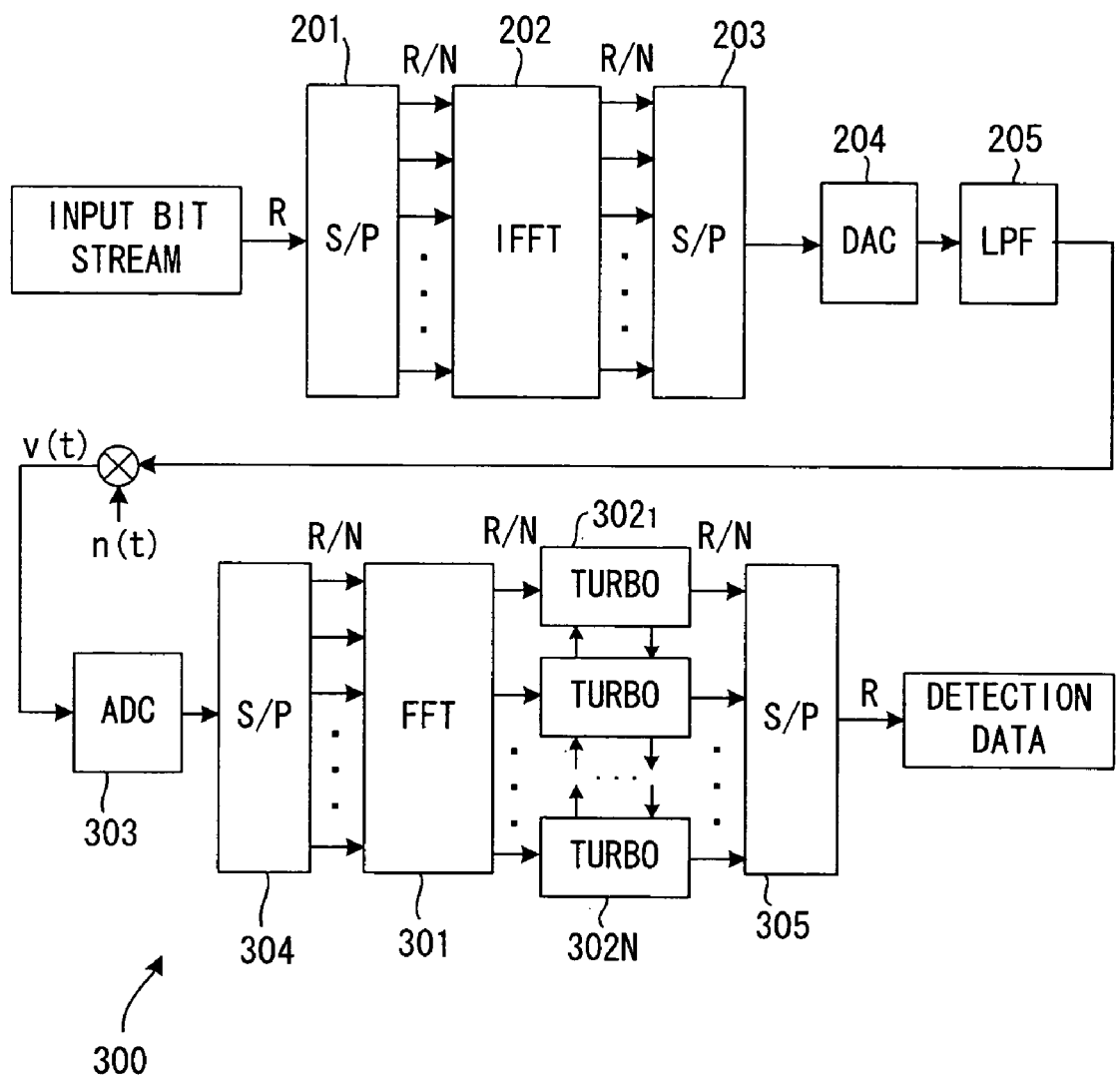
FIG. 11 is a block diagram depicting a DMT base communication system using the turbo receiver of the present invention.

As an application of the turbo receiver of the present invention, a DMT base communication system is considered. FIG. 11 is a block diagram depicting the DMT base communication system using this turbo receiver, and has a configuration where the turbo receiver of the present invention is disposed in the subsequent stage of the FFT section of the receiver in a known DMT communication system.

In the communication system in FIG. 11, the input beam stream with data rate R (bits/sec: bps) is transferred at the new rate R/N (bps) after the serial-parallel converter (S/P) 201 through N number of parallel sub-channels. The N point IFFT 202 combines the N parallel data and converts it into one set of real-time domain sample signals. In the parallel-serial converter (P/S) 203, these N samples are converted into a serial format, and are continuously input into the digital-analog converter (DAC) 204. The output signal of the low pass filter (LPF) 205 at the DAC output side is the duration DMT signal. In the white Gaussian noise channel, the transmission DMT signal is deteriorated by the white Gaussian noise n(t) and is sent to the DMT receiver 300. The receiver executes a function the opposite of the transmitter. The FFT 301 performs demodulation processing for the signals sent via each sub-channel as N matched filter arrays. The turbo $302_1$-$302_N$ perform sub-channel processing based on the turbo algorithm of the present invention, and by this, BER improves even if a frequency offset exists. 303 is the AD converter, 304 is the serial-parallel converter and 305 is the parallel-serial converter.

Figure 12:
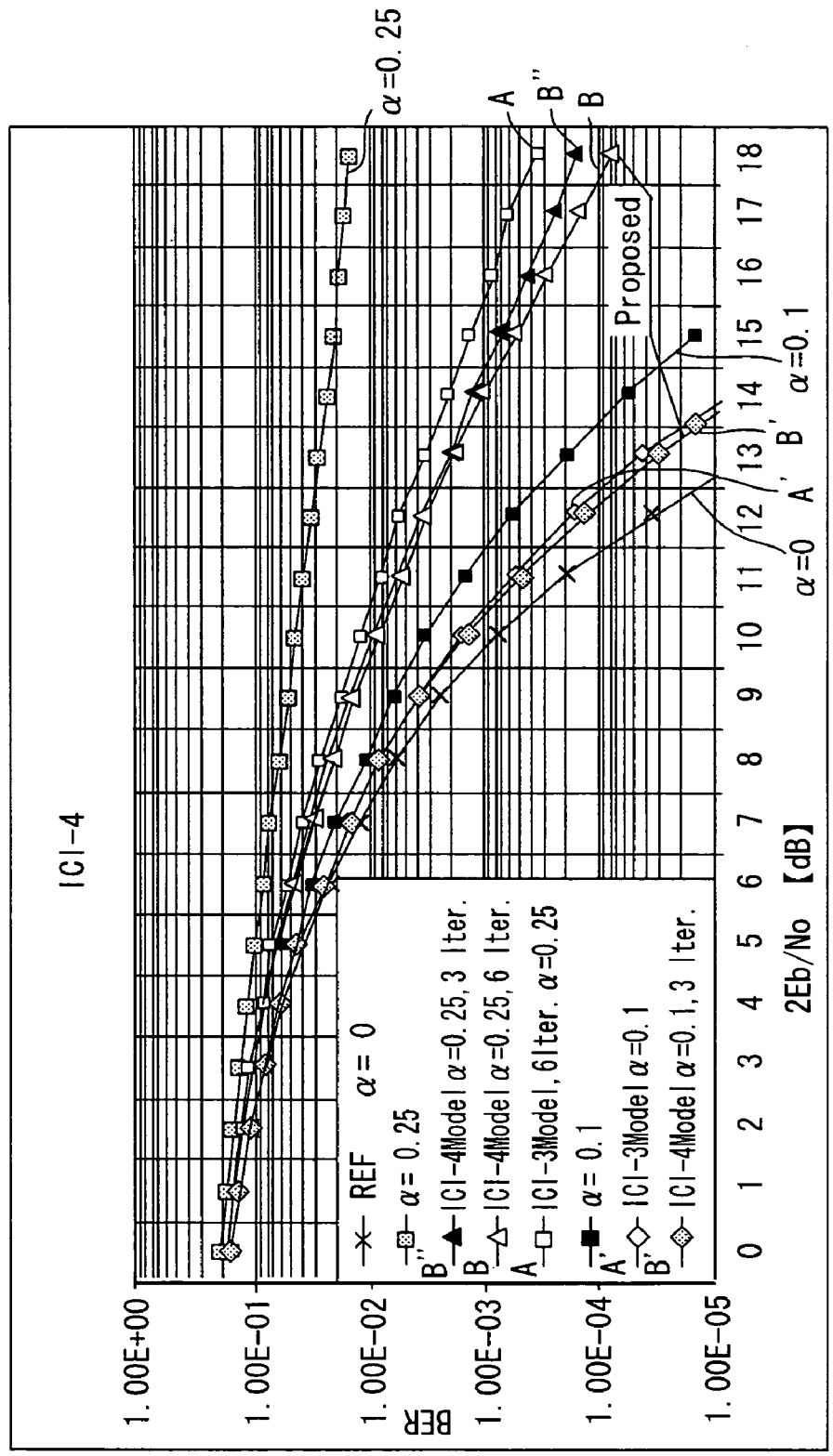
FIG. 12 is a characteristic diagram depicting the BER performance of the DMT receiver having the turbo processing function of the present invention.

FIG. 12 shows the BER performance of a conventional DMT base receiver and the BER performance of a DMT receiver which has the turbo processing function of the present invention, and performs three times and six times of turbo repeats. In FIG. 12, a case of N=64 is shown, and the BER performance is shown for $2Eb/N_0$ using a frequency offset normalized by an inter-channel frequency as a parameter, and "proposed" is indicated by the BER characteristic B and B' (ICI-four model) of the present invention.

As FIG. 12 shows, the BER characteristic improves as the frequency offset becomes smaller, and the BER characteristic is better in the "ICI-four model" of the present invention than the conventional device. In the case of the proposed "ICI-three model" (characteristics A and A'), the BER characteristic improves for 2 dB.

As described above in the multi-carrier communication system, the effect of ICI on adjacent sub-channels was studied. The performance of a conventional matched filter receiver rapidly deteriorates as the coupling of adjacent sub-channels increase or as the frequency offset increases. Whereas the present invention is a receiver based on an estimated posterior probability, and a receiver of each sub-channel is a turbo receiver for transferring information to the receivers of the adjacent sub-channels, and refines the estimated posterior probability using the information derived by the receivers of the adjacent sub-channels repeatedly. Therefore the turbo receiver of the present invention can improve BER performance considerably compared with a conventional matched filter receiver. This is because the non-linear signal processing of the turbo algorithm of the present invention uses the information acquired by the adjacent sub-channels so as to maximize the posterior probability. The biggest improvement in BER is generated in a high S/N ratio area where ICI dominates Gaussian noise. According to the simulation results, the turbo receiver of the present invention can achieve good performance throughout a considerably wide rage of ICI coupling coefficients.

What is claimed is:

1. A multi-carrier communication system for transmitting/receiving signals via at least four sub-channels, comprising:
    a transmitter for transmitting data independently via the four sub-channels;
    a receiver comprising a receive unit disposed for each sub-channel for receiving data from a corresponding sub-channel and performing soft decision of the receive data; and
    means for inputting soft decision target values in receive units corresponding to three sub-channels other than a target sub-channel to a receive unit of the target sub-channel,
    wherein the receive unit of the target sub-channel adjusts its own soft decision target value using the soft decision target values that are input from the receive units of the other sub-channels, and decides the receive data based on the adjusted soft decision target value.

2. The communication system according to claim 1, wherein the receive unit of said target sub-channel further comprises:
    means for computing a difference between a probability that the data received from the target sub-channel is one of a binary and a probability that the data is the other of a binary as said soft decision target value, considering degree of coupling of cross-talk paths;
    means for adjusting the soft decision target value of the target sub-channel using said soft decision target values that are input from the receive units of the three sub-channels other than the target sub-channel; and
    a decision unit for deciding the receive data based on said adjusted soft decision target value.

3. The communication system according to claim 1, wherein the receive unit of said target sub-channel further comprises:
    means for creating first to eighth reference signals to be calculated considering cross-talk from the three sub-channels other than the target sub-channel in each of a total of eight data combinations of the case when all the data of the three data items transmitted by the three sub-channel signals are the same, and the cases when at least one data item is different;
    eight correlation means for integrating the result of multiplication between each reference signal and the actual receive signal respectively;
    means for generating the soft decision target value of the target sub-channel using each correlation unit output and said soft decision target values that were input from the receive units of the three sub-channels other than the target sub-channel; and
    a decision unit for deciding the receive data based on the soft decision target value.

4. The multi-carrier communication system according to claim 3, wherein said receive unit is installed in the subsequent stage of an FFT constituting the DMT communication system.

5. A receiver in a multi-carrier communication system for transmitting data independently via at least four sub-channels, comprising:
    a receive unit disposed for each sub-channel for receiving data from a corresponding sub-channel and performing soft decision of the receive data,
    wherein the receive comprises:
    soft decision target value output means for computing a difference between a probability that data received from its own sub-channel is one of a binary and a probability where said data is the other of a binary as a soft decision target value, considering the degree of coupling between channels, and adjusting and outputting the soft decision target value of said sub-channel using soft decision target values that are input from the receive units of the other three sub-channels; and
    a decision unit for deciding the receive data based on said adjusted soft decision target value.

6. The receiver according to claim 5, wherein
said soft decision target value output means further comprises means for creating first to eighth reference signals to be calculated considering cross-talk from said three sub-channels in each of a total of eight data combinations of the case when all the data of three data items transmitted by the three sub-channel signals are the same, and the cases when at lest one data item is different;

eight correlation means for integrating the result of multiplication between each reference signal and the actual receive signal respectively; and means for generating the soft decision target value of the target sub-channel using each correlation unit output and said soft decision target values that are input from the receive units of said three sub-channels.

* * * * *